3,546,270
BIS-METHYLENE MALONIC ACID NITRILES
Rudolf Kirchmayr, Binningen, Basel-Land, Hans Jakob Peterli, Fullinsdorf, Basel-Land, and Hansjörg Heller, Riehen, Switzerland, assignors to Geigy Chemical Corporation, Ardsley, N.Y., a corporation of New York
No Drawing. Filed July 18, 1966, Ser. No. 565,725
Claims priority, application Switzerland, July 23, 1965, 10,366/65; July 15, 1966, 10,201/66
Int. Cl. C07c 69/76, 103/24, 121/70
U.S. Cl. 260—465                                    10 Claims

ABSTRACT OF THE DISCLOSURE

Bis-methylene malonic acid nitriles, useful as UV absorbers.

---

The present invention concerns new UV absorbent, light stable compounds, their use for the stabilizing of light-sensitive organic material and for the production of light filters, also, as industrial product, the organic material the light fastness of which is improved with the aid of these compounds and light filters having a content of these UV absorbent compounds, as well as processes for the production of these new UV absorbers.

It is known that certain methylene cyanoacetic acid and methylene malodinitrile derivatives of the general formulas

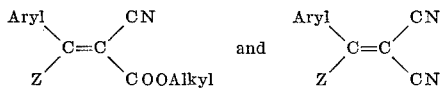

wherein Z represents hydrogen, an alkyl or aryl radical, absorb UV light. Of these compounds, the two representatives α-carbethoxy and α-cyano-β-phenyl cinnamic acid nitrile have proved successful in practice, particularly in nitrocellulose, as UV filters and UV absorbers. Most other representatives of this class of compounds have not achieved any practical importance either because of lack of fastness to light or insufficient light absorption.

In addition to light fastness and absorption, also the fastness to sublimation of a UV absorber is becoming of greater and greater importance. At the high temperatures to which the thermoplastic masses are exposed in the modern machines which are built for high output, a considerable amount of the previously known UV absorbers of the cinnamonitrile series sublimes out of the thermoplastic mass. This leads not only to a loss of UV absorber and a reduction of the light stability of the plastic itself but also, in some cases, to fouling of the apparatus, e.g. of the injection moulds, or to partial blocking of the spinnerets. These disadvantages can also have a disadvantageous effect on the appearance and even the rigidity of moulded plastics. The disturbances of the production process due to the volatility of UV absorbers incorporated into the mass are directly due to the amount of deposited sublimate; relatively high volatility of the UV absorber thus means more frequent interruption of the production process, more frequent cleaning of the apparatus and removal of waste.

It has now been found that the disadvantages described can be removed to a considerable extent if the new bis-methylene malonic acid compounds of Formula I

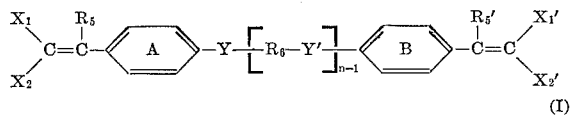

are used as UV absorbers. These compounds are distinguished by their slight self-colour, good fastness to light, slight sensitivity to alkali and heavy metal and their high light absorption coupled with excellent fastness to sublimation.

In general Formula I as well as in subsequent formulae $X_1$, $X_1'$, $X_2$ and $X_2'$ independently of each other represent the groups —$COR_1$ or —CN, wherein $R_1$ represents one of the groups

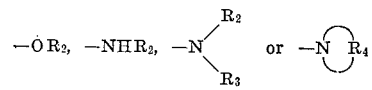

wherein the substituents $R_2$, $R_3$ and $R_4$ are free from the atom groupings

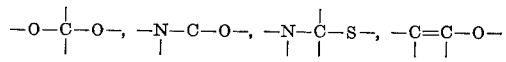

and

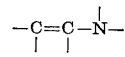

In the groups represented by $R_1$, $R_2$ represents an optionally substituted alkyl group, preferably (a) An unsubstituted alkyl group having 1 to 22 C atoms such as the methyl, ethyl, propyl, butyl, isobutyl, octyl, 2-ethylhexyl, dodecyl or octadecyl group, (b) An oxaalkyl group having 3 to 21 C atoms, e.g. a monooxaalkyl group such as the 2-methoxyethyl, 2-butoxyethyl, 2-decyloxyethyl or 4-methoxybutyl group, or a dioxa-alkyl group having 5 to 23 C atoms such as the 2-(2-isopropoxyethoxy)-ethyl group or the 4-(4-methoxybutoxy)-butyl group;

(c) A hydroxyalkyl group having 2 to 12 C atoms, e.g. the 2-hydroxyethyl, 2- or 3-hydroxypropyl or 4-hydroxybutyl group, (d) A hydroxyoxaalkyl group having 4 to 12 C atoms, e.g. a hydroxy mono-oxaalkyl group such as the 2-(2-hydroxyethoxy)-ethyl or -propyl group or a hydroxy-dioxaalkyl group having 6 to 14 C atoms such as the 2-[2-(2-hydroxyethoxy)-ethoxy]-ethyl- or -propyl group;

An optionally substituted alkenyl group, preferably an unsubstituted alkenyl group having 3 to 18 C atoms, e.g. the allyl, methallyl, $\Delta^{10}$-undecylenyl or $\Delta^9$-octadecylenyl group;

An optionally substituted cycloalkyl group, preferably of at most 12 carbon atoms and 5 to 6 ring members, e.g. a hydrocarbon group having a 5-membered ring and, in all, 5 to 12 C atoms, such as the cyclopentyl or 2-methylcyclopentyl groups, or a 6-membered ring with, in all, 6 to 12 C atoms such as the cyclohexyl or 4-butylcyclohexyl group;

An optionally substituted aralkyl group, preferably a hydrocarbon group having 7 to 19 C atoms, which group contains an optionally alkyl-substituted phenyl radical, e.g. the benzyl, α- and β-phenylethyl, o-methylbenzyl, p-methylbenzyl or p-octylbenzyl group;

An optionally substituted monooxa-(aralkyl) group preferably having 8 to 24 C atoms and comprising an optionally alkoxy-substituted phenyl-alkyl radical or alkyl-substituted phenoxy-alkyl radical, e.g. the p-methoxybenzyl, p-butoxybenzyl, 2-phenoxyethyl, 2-benzyloxyethyl or 2-(p-dodecylphenoxy)-ethyl group; or An optionally substituted aryl group which is preferably carbocyclic mono-nuclear, preferably an aryl hydrocarbon group having 6 to 20 C atoms or a monooxa-(alkylaryl) hydrocarbon group having 7 to 20 C atoms and, particularly, a phenyl ring optionally substituted by alkyl or alkoxy groups, e.g. the phenyl, m- or p-methylphenyl, p-tert.butylphenyl, p-tert.octylphenyl, p-tert.dodecylphenyl, the o- or p-methoxyphenyl, o- or p-ethoxyphenyl or the m-dodecyloxyphenyl group.

$R_3$ has the same meaning as $R_2$, preferably however, it represents an unsubstituted alkyl group having 1 to 22 C atoms such as the methyl, ethyl, propyl, butyl, isobutyl, octyl, 2-ethylhexyl, dodecyl or octadecyl group;

$R_4$ represents an alkylene group bound to the nitrogen preferably by 4 to 6 C atoms, e.g. a tetra-, penta- or hexa-methylene group; or a monooxaalkylene or monothiaalkylene group having preferably 4 to 8 C atoms, e.g. the groups $$-CH_2CH_2-O-CH_2CH_2-,\ -CH_2-\underset{CH_3}{CH}-O-CH_2CH_2-$$

$$-CH_2-\underset{CH_2CH_2CH_2CH_3}{CH}-O-CH_2CH_2-,\ -CH_2-CH_2-S-CH_2-CH_2-$$

or $$-CH_2-\underset{CH_3}{CH}-S-\underset{CH_3}{CH}-CH_2-$$

which groups, together with the nitrogen atom, form a 5- to 7-membered saturated azaheterocycle.

Also, in general Formula I and in the following formulae:

Y and Y′ each represent a bivalent radical of the formula —NHCO—, —NHSO$_2$— or —NHCOO— which radical is attached to the ring A or B by the nitrogen atom, preferably however each represents —O—, $R_5$ and $R_5'$ each represent an optionally substituted aryl group, particularly an aryl hydrocarbon group having 6 to 18 C atoms and preferably an alkyl-substituted or alkoxy-substituted phenyl radical, e.g. the phenyl, p-methylphenyl, p-tert.butylphenyl or p-octyl-phenyl, p-methoxyphenyl or o-dodecycloxyphenyl group, and when all X's are only —COR$_1$ groups, $R_5$ and $R_5'$, in addition to the aryl group, also represent, and this preferably, hydrogen; but when two of the X's represent cyano groups then $R_5$ and $R_5'$, in addition to the aryl group, can also represent an optionally substituted alkyl group, preferably an unsubstituted low alkyl group, e.g. the methyl, ethyl, isopropyl or butyl group or an optionally substituted aralkyl group, preferably an aralkyl hydrocarbon group having 7 to 19 C atoms and a 6-membered mononuclear carbocyclic aryl moiety, e.g. the benzyl or 2-phenethyl group.

$R_6$ represents an alkylene group having preferably 2 to 12 C atoms, e.g. the 1,2-ethylene, 1,2-propylene, trimethylene, tetramethylene, pentamethylene, octamethylene, dodecamethylene, 2,2,5-trimethyl-hexamethylene or 2,5-diethylhexamethylene group; a monooxaalkylene or monothiaalkylene group having, preferably 4 to 12 C atoms, e.g. the groups $$-CH_2CH_2CH_2CH_2-O-CH_2CH_2CH_2CH_2-$$

or —CH$_2$CH$_2$CH$_2$—S—CH$_2$—CH$_2$CH$_2$; a dioxaalkylene or dithiaalkylene group advantageously having 6 to 14 C atoms, e.g. the groups $$-CH_2CH_2-O-CH_2CH_2-O-CH_2CH_2-$$

$$-CH_2-\underset{CH_3}{CH}-O-CH_2CH_2-O-\underset{CH}{CH}-CH_2-$$

$$-CH_2CH_2-S-CH_2CH_2-S-CH_2CH_2-$$

or $$-CH_2CH_2-S-\underset{CH_3}{CH}-\underset{CH_3}{CH}-S-CH_2CH_2-$$

a cycloalklylene group having preferably 4 to 12 C atoms, e.g. the groups $$CH_2-C\underset{CH_2-CH_2}{\overset{CH_2-CH_2}{<}}CH-CH_2-$$

$$-CH\underset{\underset{CH_3}{C}}{\overset{\overset{CH_3}{C}}{<}}CH-$$

$$-C\underset{(CH_2)_4}{\overset{(CH_2)_4}{<}}CH-$$

an aralkylene group, preferably an aralkylene hydrocarbon group having 8 to 22 C atoms, e.g. the groups $$-CH_2-\bigcirc-CH_2,\ -CH_2-\bigcirc-CH_2CH_2CH_2CH_2-$$

or $$-CH_2-\bigcirc\underset{-CH_2}{\overset{}{-}}-\underset{CH_3}{\overset{CH_3}{C}}-CH_2-\underset{CH_3}{\overset{CH_3}{C}}-CH_3$$

or a monooxaaralkylene group, chiefly a monooxaaralkylene hydrocarbon group having 9 to 21 C atoms, the aryl moiety of the aralkylene and monooxaaralkylene groups preferably being an optionally alkyl-substituted or alkoxy-substituted phenylene radical, e.g. the groups $$-CH_2-\bigcirc-OCH_2CH_2-$$

$$-CH_2-\bigcirc-O-\bigcirc-CH_2-$$

or $$-CH_2-\bigcirc-CH_2-O-CH_2CH_2CH_2-$$

and when Y or Y′ is a nitrogen-containing group, i.e. —NHCO—, —NHSO$_2$— or —NHCOO—, $R_6$ also represents the phenylene group, two or more hetero atoms present in or bound to $R_6$ being separated from each other by at least 2 carbon atoms, and oxygen atoms bound to $R_6$ and linking it to the benzene rings A and B being bound at saturated carbon atoms of $R_6$; and $n$ represents 2 or, when Y is oxygen, also 1.

Preferably the compounds of the Formula I together contain at most 86 C atoms in all the groups $X_1$, $X_2$, $X_1'$, $X_2'$, $R_5$, $R_5'$ and $R_6$.

In the above nomenclature, an oxa-hydrocarbon or thiahydrocarbon radical is a hydrocarbon radical in which a non-terminal —CH$_2$-group, i.e. one in the middle of a sequence of carbon atoms, is replaced by an oxygen or sulfur atom. The groups $$-CH_2-CH_2-O-CH_2-CH_3 \text{ and } -CH_2-O-\bigcirc$$

are given as examples.

The 1,4-phenylene rings A and B can be substituted by chemically inert and non-colouring substituents; preferably however, they are unsubstituted in the 2-, 3-, 5- and 6-positions or they are substituted in any, but at most two, of these positions by halogen, e.g. fluorine, chlorine or bromine, low alkyl groups, e.g. methyl, ethyl or butyl groups, or alkoxy groups having 1 to 8 C atoms, e.g. methoxy, ethoxy or octyloxy groups.

The new bis-methylene malonic acid derivatives can be produced by various methods, for example:

(A) By condensation of 1 mol of dicarbonyl compound of Formula II $$O=\underset{R_5}{\overset{R_5}{C}}-\bigcirc{A}-Y-\left[R_6-Y'-\right]_{n-1}-\bigcirc{B}-\underset{R_5'}{\overset{R_5'}{C}}=O \qquad (II)$$

with 2 mols of identical or different malonic acid derivatives of Formulae III and IIIa

under the known conditions for Knoevenagel condensation.

In some cases, particularly if $R_5$ or $R_5'$ is not hydrogen, the reactivity of the dicarbonyl compounds of Formula II is insufficient for a successful condensation. In such cases an improvement is attained if, before the reaction with the malonic acid derivatives, the carbonyl compounds are converted into the activated forms such as into the corresponding bis-dichlorides or bis-imines, e.g. converted with cyclohexylamine into the corresponding double Schiff's base, such conversions being conventional.

(B) By reaction of 2 mols of identical or different compounds of Formulae IV and IVa

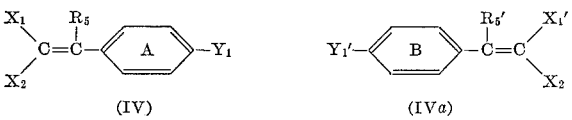

wherein $Y_1$ and $Y_1'$ represent the hydroxyl or amino group, with 1 mol of a bifunctional alkylating or acylating agent of Formula V $$Z—R_6—Z \qquad (V)$$

wherein Z, when $Y_1$ or $Y_1'$ is HO—, represents halogen, preferably the chlorine, bromine or iodine atoms or the radical of a strong oxygen-acid, preferably the radical of a sulphur-oxygen-acid, e.g. the radical $—OSO_3$, $—OSO_2$-low-alkyl or $—OSO_2$-aryl and, when $Y_1$ or $Y_1'$ are $H_2N—$, Z represents the group $—COZ'$, $—SO_2Z'$ or $—OCOZ'$ wherein Z' is halogen, preferably the chlorine atom. Suitable alkylating agents of Formula V are thus bis-esters of diols of the formula $HO—R_6—OH$ which are derived from a hydrohalic acid or a strong oxygen acid. Suitable acylating agents are thus dicarboxylic acid halides; dicarboxylic acid chlorides are particularly suitable and cheaply available. Naturally, method B can only be used for the synthesis of compounds in which $n=2$.

Some of the dicarbonyl compounds of Formula II which are necessary for method A are known and are obtained either by the usual aldehyde or ketone syntheses or, when $n=2$, also by etherification or acylation of 1 mol of each of the corresponding carbonyl compounds of Formulas VI and VIa

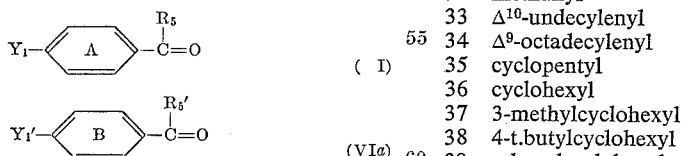

in which $Y_1$ and $Y_1'$ have the same meanings as in Formulas IV and IVa, by means of the bifunctional alkylating or acylating agents of Formula V.

Naturally, these carbonyl compounds of Formula VI or VIa can also first be condensed with the malonic acid derivatives of Formulas III and IIIa as described above for method A, to form the methylene malonic acid derivatives of Formulas IV and IVa which can be further reacted according to method B.

Compounds falling under Formula I can be produced for instance, from the following products usable as starting compounds in the processes described above:

(1) Dicarbonyl compounds of Formula II: 4,4'-diformyl diphenyl ether, 3-chloro-4,4'-diformyl diphenyl ether (both obtained from the corresponding tetrabromine compounds by saponification or from the chloromethyl compounds (Sommelet)), 1,4-bis-(4-formylphenoxy)-butane, 1,2-bis-(3-methyl-4-formylphenoxy) - ethane (both obtained according to Gattermann), 1,5-bis-(4 - acetylphenoxy)-pentane (obtained by etherifying p-hydroxy-acetophenone with 1,5-dibromobutane), 4,4'-diacetyl-diphenyl ether, 4,4'-dibutyryl-diphenyl ether, 4,4'-divaleroyl-diphenyl ether, 4,4'-dipropionyl-diphenyl ether, 4,4'-dipivaloyl-diphenyl ether, 4,4'-dibenzoyl-diphenyl ether (obtained according to Friedel-Crafts) and 4,4'-dibenzylcarbonyl-diphenyl ether.

(2) Malonic acid derivatives of Formulas III or IIIa:

(a) Ester of malonic acid falling under Formulas III and IIIa, which are of the formula

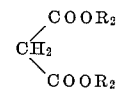

in which latter formula $R_2$ has the meanings given below.

| No.: | $R_2$ |
|---|---|
| 1 | methyl |
| 2 | ethyl |
| 3 | propyl |
| 4 | n-butyl |
| 5 | isobutyl |
| 6 | n-octyl |
| 7 | dodecyl |
| 8 | octadecyl |
| 9 | docosanyl |
| 10 | 2-ethylhexyl |
| 11 | 2-methoxyethyl |
| 12 | 2-ethoxyethyl |
| 13 | 2-butoxyethyl |
| 14 | 2-dodecyloxyethyl |
| 15 | 4-methoxybutyl |
| 16 | 2-nonadecyloxyethyl |
| 17 | 2-(2-methoxyethoxy)-ethyl |
| 18 | 2-(2-butoxyethoxy)-ethyl |
| 19 | 2-(2-iso-propoxyethoxy)-ethyl |
| 20 | 4-(4-methoxybutoxy)-butyl |
| 21 | 4-(18-methoxyoctadecyloxy)-butyl |
| 22 | 2-hydroxyethyl |
| 23 | 2-hydroxypropyl |
| 24 | 3-hydroxypropyl |
| 25 | 4-hydroxybutyl |
| 26 | 12-hydroxy-dodecyl |
| 27 | 2-(2-hydroxyethoxy)-ethyl |
| 28 | 2-(10-hydroxydecyloxy)-ethyl |
| 29 | 2-[2-(2-hydroxyethoxy)-ethoxy]-ethyl |
| 30 | 2-[2-(10-hydroxydecyloxy)-ethoxy]-ethyl |
| 31 | allyl |
| 32 | methallyl |
| 33 | $\Delta^{10}$-undecylenyl |
| 34 | $\Delta^9$-octadecylenyl |
| 35 | cyclopentyl |
| 36 | cyclohexyl |
| 37 | 3-methylcyclohexyl |
| 38 | 4-t.butylcyclohexyl |
| 39 | n-hexylcyclohexyl |
| 40 | benzyl |
| 41 | 1-phenylethyl |
| 42 | 2-phenylethyl |
| 43 | 2-phenyloctadecyl |
| 44 | m-methylbenzyl |
| 45 | p-methoxybenzyl |
| 46 | p-decyloxybenzyl |
| 47 | m-butoxybenzyl |
| 48 | o-methylbenzyl |
| 49 | p-dodecylbenzyl |
| 50 | 2-(2-phenylethoxy)-ethyl |
| 51 | 2-[4-(p-n-dodecylphenyl)-butoxy]-ethyl |
| 52 | 2-benzyloxyethyl |
| 53 | 2-phenoxypropyl |
| 54 | p-butyl |

| No.: | $R_2$ |
|---|---|
| 55 | p-t.butylphenyl |
| 56 | p-octylphenyl |
| 57 | p-tetradecylphenyl |
| 58 | p-methoxyphenyl |
| 59 | p-butoxyphenyl |
| 60 | p-octoxyphenyl |
| 61 | p-tetradecyloxyphenyl |

(b) Amides of malonic acid falling under Formulas III and IIIa, which are of the formula

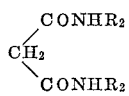

in which latter formula —$NHR_2$ has the meaning given in the table below.

| No.: | —$NHR_2$ |
|---|---|
| 62 | methylamide |
| 63 | butylamide |
| 64 | octadecylamide |
| 65 | docosanylamide |
| 66 | methoxyethylamide |
| 67 | ethoxyethylamide |
| 68 | nonadecyloxyethylamide |
| 69 | 2-(2-methoxyethoxy)-ethylamide |
| 70 | 2-(2-butoxyethoxy)-ethylamide |
| 71 | 4-(18-methoxyoctadecyloxy)-butylamide |
| 72 | 2-hydroxyethylamide |
| 73 | 4-hydroxybutylamide |
| 74 | 12-hydroxydodecylamide |
| 75 | 2-(2-hydroxyethoxy)-ethylamide |
| 76 | 2-(10-hydroxydecyloxy)-ethylamide |
| 77 | 2-[2-(hydroxyethoxy)-ethoxy]-ethylamide |
| 78 | 2-[2-(hydroxydecyloxy)-ethoxy]-ethylamide |
| 79 | allylamide |
| 80 | $\Delta^9$-octadecylenylamide |
| 81 | cyclopentylamide |
| 82 | cyclohexylamide |
| 83 | 4-t.butylcyclohexylamide |
| 84 | n-hexylcyclohexylamide |
| 85 | benzylamide |
| 86 | 1-phenylethylamide |
| 87 | 18-phenyloctadecylamide |
| 88 | 2-(2-phenylethoxy)-ethylamide |
| 89 | 2-[4-(p-n-dodecylphenyl)-butoxy]-ethylamide |
| 90 | phenylamide |
| 91 | p-tolylamide |
| 92 | p-octylphenylamide |
| 93 | p-tetradecylphenylamide |
| 94 | p-methoxyphenylamide |
| 95 | p-butoxyphenylamide |
| 96 | p-tetradecyloxyphenylamide |

(c) Amides of malonic acid falling under Formulas III and IIIa, which are of the formula

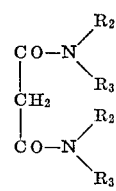

in which latter formula

has the meanings given in the table below.

| No.: | —$NR_2(R_3)$ |
|---|---|
| 97 | dimethylamide |
| 98 | diethylamide |
| 99 | N-methyl-N-ethylamide |
| 100 | dibutylamide |
| 101 | dioctylamide |
| 102 | didocosanylamide |
| 103 | (di-2-methoxyethyl)-amide |
| 104 | (di-2-nonadecyloxyethyl)-amide |
| 105 | methyl-3-methoxypropylamide |
| 106 | [di-2-(2-methoxyethoxy)-ethyl]-amide |
| 107 | [di-4-(18-methoxyoctadecyloxy)-butyl]-amide |
| 108 | (di-2-hydroxyethyl)-amide |
| 109 | (di-4-hydroxybutyl)-amide |
| 110 | (di-12-hydroxydodecyl)-amide |
| 111 | [di-2-(2-hydroxyethoxy)-ethyl]-amide |
| 112 | [di-2-(10-hydroxydecyloxy)-ethyl]-amide |
| 113 | {di-2-[2-(2-hydroxyethoxy)-ethoxy]-ethyl}-amide |
| 114 | {di-2-[2-(10-hydroxydecyloxy)-ethoxy]-ethyl}-amide |
| 115 | di-allylamide |
| 116 | (di-$\Delta^9$-octadecylenyl)-amide |
| 117 | dicyclopentylamide |
| 118 | dicyclohexylamide |
| 119 | di-[p-(n-hexyl)-cyclohexyl]-amide |
| 120 | dibenzylamide |
| 121 | di-(18-phenyloctadecyl)-amide |
| 122 | di-[2-(2-phenylethoxy)-ethyl]-amide |
| 123 | diphenyl-amide |
| 124 | di-p-tolyl-amide |
| 125 | (di-p-tetradecylphenyl)-amide |
| 126 | di-p-methoxyphenyl-amide |
| 127 | di-p-tetradecyloxyphenyl-amide |

(d) Amides of malonic acid falling under Formulas III and IIIa which are of the formula

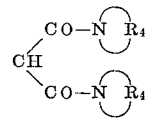

in which latter formula

has the meanings given in the table below.

| No.: | —$NR_4$ |
|---|---|
| 128 | morpholide |
| 129 | piperidide |
| 130 | 2-methyl-morpholide |
| 131 | 2-butyl-morpholide |
| 132 | thiomorpholide |
| 133 | 2,6-dimethyl-thiomorpholide |
| 134 | pyrrolidide |
| 135 | hexahydroazepide |

(e)

| No.: | |
|---|---|
| 136 | malodinitrile |

(f) Esters of amides of malonic acid falling under Formulas III and IIIa.

| No.: | |
|---|---|
| 137 | methylester methylamide |
| 138 | ethylester ethylamide |
| 139 | ethylester diethylamide |
| 140 | ethylester piperidide |
| 141 | ethylester morpholide |
| 142 | ethylester benzylamide |
| 143 | ethylester cyclohexylamide |

(g) Esters of cyanoacetic acid falling under Formulas III and IIIa which are of the formula

in which latter formula $R_2$ has the meanings given in the table below.

| No.: | $R_2$ |
|---|---|
| 144 | methyl |
| 145 | decyl |
| 146 | octadecyl |
| 147 | docosanyl |
| 148 | 2-methoxy-ethyl |
| 149 | 2-nonadecyloxyethyl |
| 150 | 2-(2'-methoxyethoxy)-ethyl |
| 151 | 4-(18-methoxyoctadecyloxy)-butyl |
| 152 | 2-hydroxyethyl |
| 153 | 12-hydroxy-dodecyl |
| 154 | 2-(2-hydroxyethoxy)-ethyl |
| 155 | 2-(10-hydroxydecyloxy)-ethyl |
| 156 | 2-[2-(2-hydroxyethoxy)-ethoxy]-ethyl |
| 157 | 2-[2-(10-hydroxydecyloxy)-ethoxy]-ethyl |
| 158 | allyl |
| 159 | $\Delta^9$-octadecenyl |
| 160 | cyclohexyl |
| 161 | p-(n-hexyl)-cyclohexyl |
| 162 | benzyl |
| 163 | 18-phenyl-octadecyl |
| 164 | 2-(2-phenylethoxy)-ethyl |
| 165 | phenyl |
| 166 | 2-(4-p-dodecylphenyl)-butoxy |
| 167 | p-tolyl |
| 168 | p-t-butylphenyl |
| 169 | p-tetrodecyl-phenyl |
| 170 | p-methoxyphenyl |
| 171 | p-butoxyphenyl |
| 172 | p-tetradecyloxyphenyl |
| 172a | cyclopentyl |

(h) Amides of cyanoacetic acid falling under Formulas III and IIIa and being of the formula $$NC-CH_2-CO-NHR_2$$

wherein —$NHR_2$ has the meanings given in the table below.

| No.: | —$NHR_2$ |
|---|---|
| 173 | methyl |
| 174 | ethyl |
| 175 | butyl |
| 176 | octyl |
| 177 | docosanyl |
| 178 | 2-methoxyethyl |
| 179 | 2-nonadecyloxyethyl |
| 180 | 2-(2-methoxyethoxy)-ethyl |
| 181 | 2-hydroxyethyl |
| 182 | 4-hydroxybutyl |
| 183 | 12-hydroxydodecyl |
| 184 | 2-(2-hydroxyethoxy)-ethyl |
| 185 | 2-(10-hydroxydecyloxy)-ethyl |
| 186 | 2-[2-(2-hydroxyethoxy)-ethoxy]-ethyl |
| 187 | 2-[2-(10-hydroxydecyloxy)ethoxy]-ethyl |
| 188 | allyl |
| 189 | $\Delta^9$-octadecenyl |
| 190 | cyclopentyl |
| 191 | cyclohexyl |
| 192 | p-(n-hexyl)-cyclohexyl |
| 193 | benzyl |
| 194 | 18-phenyloctadecyl |
| 195 | 2-(2-phenylethoxy)-ethyl |
| 196 | 2-[4-(p-dodecylphenyl)-butoxy]-ethyl |
| 197 | p-tolyl |
| 198 | phenyl |
| 199 | p-octylphenyl |
| 200 | p-methoxybenzyl |
| 201 | p-tetradecylphenyl |
| 202 | p-methoxyphenyl |
| 203 | p-octylbenzyl |
| 204 | p-tetradecyloxyphenyl |

(i) Amides of cyanoacetic acid falling under Formulas III and IIIa and being of the formula

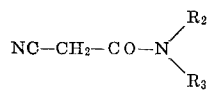

wherein

has the meanings given in the table below.

| No.: | —$NH_2(R_3)$ |
|---|---|
| 205 | dimethyl amide |
| 206 | diethyl amide |
| 207 | dibutyl amide |
| 208 | dioctyl amide |
| 209 | didocosanyl amide |
| 210 | di-2-methoxymethyl amide |
| 211 | di-2-nonadecyloxyethyl amide |
| 212 | di-2-(2-methoxyethoxy)-ethyl amide |
| 213 | di-2-hydroxyethyl amide |
| 214 | di-4-hydroxybutyl amide |
| 215 | di-12-hydroxydodecyl amide |
| 216 | di-2-(2-hydroxyethoxy)-ethyl amide |
| 217 | di-2-(10-hydroxydecyloxy)-ethyl amide |
| 218 | di-2-[2-(2-hydroxyethoxy)-ethoxy]-ethyl amide |
| 219 | di-2-[2-(10-hydroxydecyloxy)-ethoxy]-ethyl amide |
| 220 | di-allyl amide |
| 221 | di-$\Delta^9$-octadecenyl amide |
| 222 | di-cyclopentyl amide |
| 223 | di-cyclohexyl amide |
| 224 | di-[p-(n-hexyl)-cyclohexyl] amide |
| 225 | di-benzyl amide |
| 226 | di-18-phenyloctadecyl amide |
| 227 | di-2-(2-phenylethoxy)-ethyl amide |
| 228 | di-2-[4-(p-dodecylphenyl)-butoxy]-ethyl amide |
| 229 | diphenyl amide |
| 230 | di-p-octylphenyl amide |
| 231 | di-p-methoxybenzyl amide |
| 232 | di-p-tetradecylphenyl amide |
| 233 | di-p-octylbenzyl amide |
| 234 | di-p-methoxyphenyl amide |
| 235 | di-p-tetradecyloxyphenyl amide |

(j) Amides of cyanoacetic acid falling under Formulas III and IIIa which are of the formula

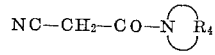

wherein

has the meanings given in the table below.

| No.: | $-N\overset{\frown}{R_4}$ |
|---|---|
| 236 | morpholide |
| 237 | piperidide |
| 238 | 2-methylmorpholide |
| 239 | 2-butylmorpholide |
| 240 | thiomorpholide |
| 241 | 2,6-dimethyl-thiomorpholide |
| 242 | pyrrolidide |
| 243 | perhydroazepide |

(3)(a) Bifunctional alkylating agents of Formula V.

| No.: | |
|---|---|
| 244 | 1,2-dibromoethane |
| 245 | 1-bromo-3-chloropropane |
| 246 | 1,4-dichlorobutane |
| 247 | 1,8-dibromooctane |

No.:
248 1,12-dibromododecane
249 1,3-dibromobutane
250 propane-1,3-dimethane sulfonate
251 butane-(1,4) bis-p-benzene-sulfonate
252 pentane-(1,5) bis-hydrosulfate
253 1,5-dibromo-3-oxapentane
254 1,7-diiodo-4-oxaheptane
255 5-oxanonane-(1,9) di-p-benzene sulfonate
256 7-oxatridecane-(1,13) di-tosylate
257 1,5-dibromo-3-thiapentane
258 1,7-dichloro-4-thiaheptane
259 1,13-dibromo-7-thiatridecane
260 3,6-di-oxaoctane-(1,8) di-tosylate
261 5,11-dioxahexadecane-(1,16) di-tosylate
262 3,6-di-thiaoctane-(1,8) di-tosylate
263 5,11-di-thiahexadecane-(1,16) di-tosylate
264 cis-1,4-di(chloromethyl)-cyclohexane
265 trans-1,4-di(chloromethyl)-cyclohexane
266 2,2,4,4-tetramethyl-cyclobutane-(1,3) di-p-tosylate
267 cis-1,4-dibromo-cyclohexane
268 trans-1,4-dibromo-cyclohexane
269 cyclodecane-(1,6) di-p-chlorobenzene-sulfonate
270 cyclododecane-(1,8) di-p-chlorobenzene-sulfonate
271 1,4-di-bromomethyl-benzene
272 1,4-di-(chloromethyl)-benzene
273 1,4-di-(bromomethyl)-2-methyl-benzene
274 4-t-dodecyl-1,2-di-(chloromethyl)-benzene
275 1,4-di-(3-hydroxybutyl)-phenyl di-mesylate
276 1-chloromethyl-4-(2-chloroethoxy)-benzene
277 1-chloromethyl-4-(16-chlorohexadecyloxy)-benzene
278 1-chloromethyl-4-[2-(4-2-chloroethoxyphenyl)-ethyl]-benzene (b) Bifunctional acylating agents of Formula V.

No.:
279 oxalyl chloride
280 adipic acid chloride
281 sebacic acid dichloride
282 terephthalic acid dichloride
283 isophthalic acid dibromide
284 cyclohexane-1,4-dicarboxylic acid chloride
285 homoterephthalic acid dichloride
286 benzene-1,3-disulfonic acid chloride
287 the dichloride of sulfoacetic acid
288 the dichloride of phenylacetic acid-4-sulfonic acid
289 the dichloride of ethane-1,2-disulfonic acid
290 the dichloride of butane-1,4-disulfonic acid
291 butane-1,4-diyl bis-chloroformate
292 hexane-1,6-diyl bis-chloroformate (4) Carbonyl compounds of Formulas VI and VIa.

No.:
293 p-hydroxybenzaldehyde
294 3-chloro-4-hydroxybenzaldehyde
295 3-isopropyl-4-hydroxybenzaldehyde
296 2-methoxy-4-hydroxybenzaldehyde
297 3-methoxy-4-hydroxybenzaldehyde
298 3,5-dimethyl benzaldehyde
299 2-butoxy-4-hydroxybenzaldehyde (these aldehydes are obtained by the Vilsmeier-Haack method)
300 p-aminobenzaldehyde
301 2-chloro-4-hydroxybenzaldehyde
302 2-fluoro-4-hydroxybenzaldehyde
303 2-chloro-4-hydroxybenzaldehyde
304 3-fluoro-4-hydroxybenzaldehyde
305 2-bromo-4-hydroxybenzaldehyde
306 3-bromo-4-hydroxybenzaldehyde
307 2-methyl-4-hydroxybenzaldehyde
308 3-methyl-4-hydroxybenzaldehyde
309 2-butyl-4-hydroxybenzaldehyde
310 3-pentyl-4-hydroxybenzaldehyde
311 2-methoxy-4-hydroxybenzaldehyde
312 3-methoxy-4-hydroxybenzaldehyde No.:
313 2-butoxy-4-hydroxybenzaldehyde
314 3-octoxy-4-hydroxybenzaldehyde
315 p-hydroxybenzophenone
316 p-hydroxy-p'-methylbenzophenone
317 p-hydroxy-p'-ethylbenzophenone
318 p-hydroxy-p'-t-butylbenzophenone
319 p-hydroxy-p'-dodecylbenzophenone
320 p-hydroxy-p'-methoxybenzophenone
321 p-hydroxy-o'-dodecyloxybenzophenone
322 p-aminobenzophenone
323 3-bromo-4-hydroxyacetophenone
324 4-hydroxy-4-ethylbenzenephenone
325 3-methyl-4-hydroxy-4'-butoxybenzophenone
326 p-hydroxyacetophenone
327 p-hydroxypropiophenone
328 p-hydroxybutyrophenone
329 p-hydroxyvalerophenone
330 p-aminoacetophenone
331 p-hydroxyphenylbenzylketone
332 p-hydroxyphenyl-4-phenylbutylketone
333 p-aminophenylbenzylketone
334 p-hydroxyphenyl-p-methylbenzylketone
335 p-hydroxyphenyl-p-dodecylbenzyl ketone (These ketones are obtained by Friedel-Crafts acylation of the corresponding phenols.)

(5) Monomethylene malonic acid derivatives of Formula IV or IVa.

No.:
336 α-carboethoxy-β-p-hydroxyphenyl)acrylic acid diethyl amide
337 α-carboethoxy-β-(4-hydroxy-2-chlorophenyl)-acrylic acid piperidide.

Naturally, esters, particularly low alkanol esters of bis-methylene malonic derivatives, i.e. compounds of Formula I wherein X is the group —COOR$_2$, wherein R$_2$ represents a lower alkyl radical, can be converted into other esters by transesterification or into amides by reaction with amines. For example, 1,4-bis-[4-(2,2-dicarboethoxyethenyl)-phenoxy]-butane can be converted by transesterification with octadecyl alcohol into 1,4-bis-[4 - (2,2-dicarbooctadecyloxyethylene)-phenoxy]-butane. In addition to the simple alkanols, also oxaalkanols are suitable for transesterification; examples are 4-methoxybutanol, 2-dodecyloxyethanol or 2-(2-butoxyethoxy)-ethanol, or hydroxy alcohols such as ethylene glycol, diethylene glycol, butane-1,4-diol or tri-ethylene glycol.

The new UV absorbers of Formula I are incorporated into the light sensitive, particularly polymeric, carriers for light filteres in amounts of 0.01 to 30%. Among other factors, the amount of UV absorber to be incorporated depends on the thickness of the light filters to be produced. For very thin films such as, e.g. lacquer coatings, amounts of 1 to 20% are preferred, for thick layers such as in polymethacrylate sheets, on the other hand amounts of 0.01 to 1% are preferred.

As carriers for the new bis-methylene malonic acid derivatives of Formula I, principally organic polymers are mentioned; also thermoplastic polymers as well as curable synthetic resins (thermosetting polymers) can be used, indeed both fully synthetic polymers as well as natural polymers as well as their polymerhomologous chemical modification products. By fully synthetic polymers are meant chiefly pure addition and pure condensation polymers, also however condensation polymers cross linked by addition polymerisation. The addition polymers which can be used as carriers for the new UV absorbers can be arranged according to the following main types:

(1) Homopolymers and copolymers of vinyl and vinylidene monomers which are converted into the corresponding polymers by radical, ionic or metal-organic polymerisation initiators. Examples of such monomers, their polymers or copolymers which are suitable carriers are: polymerisable ethylenic unsaturated halogen hydrocarbon compounds, particularly vinyl chloride, vinyl fluoride and vinylidene chloride, polymerisable hydrocarbons having a double bond capable of addition, particularly styrene, isobutylene, ethylene and propylene, including both the atactic and also the isotactic forms of polymers.

α,β-Unsaturated polymerisable carboxylic acids and functional derivatives thereof such as acrylic acid, methacrylic acid, acrylonitrile, alkyl esters (particularly low alkyl esters) and amides of acrylic and methacrylic acid, e.g. the methyl, ethyl and butyl esters of methacrylic and acrylic acid; polymerisable acyl derivatives of ethylenic unsaturated alcohols and amines, particularly those of organic carboxylic acids, in which case acyl radicals of alkane and alkene carboxylic acids having up to 18 carbon atoms and acyl radicals of aromatic monocyclic carboxylic acids such as benzoic acids and phthalic acids, as well as acyl radicals of cyclic carbonic acid imides such as those of cyanuric acid can be used. Examples are allyl phthalate, polyallyl melamines, vinyl acetate, vinyl stearate, vinyl benzoate and vinyl maleate; polymerisable polyenes having conjugated double bonds such as butadiene, isoprene, chloroprene, sorbic acid and esters thereof.

(2) Homopolymers and copolymers of epoxides, particularly of bis-epoxides formed by curing with acid or basic catalysts. Examples of this class are the polymers of bis-glycidyl ethers of geminal bis-(p-hydroxyphenyl)-alkanes and cycloalkanes.

(3) Homo- and co-polymers of lactams and lactones, particularly the copolymers of ε-caprolactam.

(4) Homo- and co-polymers of aldehydes, particularly of formaldehyde and acetaldehyde such as polyoxymethylene and polyoxyethylene.

(5) Reaction products of isocyanates with hydroxyl and/or amino compounds, particularly those from di- or poly-isocyanates with divalent or polyvalent hydroxyl or amino compounds. The polyurethanes and polyureas formed by reaction of diisocyanates with polyesters and/or polyethers containing hydroxyl groups are in this class.

The condensation polymers which are used as carriers for the new UV absorbers are, among others, particularly polyesters and polyamides. Linear thermoplastic polycondensates which are derived from dicarboxylic acids and organic dihydroxy derivatives or organic diamines on the one hand and hydroxy- or amino-carboxylic acids on the others are mentioned in particular. Preferred linear polycondensates are the fibre-forming polymers of ω,ω'-dicarboxylic acids and ω,ω'-dihydroxy compounds or ω,ω'-diamines, also of ω-hydrocarboxylic acids or of ω-amino-carboxylic acids, in particular those polymers which are derived from aliphatic, cycloaliphatic and carbocyclic non-fused aromatic carboxylic acids.

The linear condensation products of the following components are specially suitable: adipic acid-hexamethylenediamine, sebacic acid-hexamethylenediamine, terephthalic acid-ethylene glycol, terephthalic acid-1,4-dimethylol-cyclohexane, 10-aminodecane carboxylic acid (11-aminoundecylic acid).

Cross-linked polycondensates as carriers are thermosetting and are formed in particular by condensation of aldehydes with polyvalent compounds which can be condensed. Formaldehyde condensates with phenols, ureas and melamines can be mentioned.

Condensation polymers cross-linked by subsequent addition polymerisation are mainly the polyester resins, i.e. copolymers of polyesters of unsaturated organic carboxylic acids containing double bonds capable of addition with polyvalent, particularly divalent, alcohols (these polyesters optionally being modified with dicarboxylic acids not capable of addition) with vinyl or vinylidene monomers. Monomers are preferably polymerisable mixtures of styrene and/or methylmethacrylate with condensates of maleic acid, itaconic acid, citraconic acid with divalent alcohols, preferably the water addition products of ethylene oxide and propylene oxide such as ethylene glycol, propylene glycol and diethylene glycol and optionally other dicarboxylic acids of the aliphatic, alicyclic and monocyclic/aromatic series or anhydrides thereof such as succinic acid anhydride, phthalic acid anhydride, tetrachlorophthalic acid anhydride, the anhydride of 1,2,3,4,7,7, - hexachlorodicyclo[2,2,1] - hept-2-ene-5,6-dicarboxylic acid and/or of adipic acid.

This monomer mixture of unsaturated polyesters and vinyl and/or vinylidene monomers (often termed liquid polyester resin) is cross-linked, in a preferred embodiment, by radical polymerisation initiators.

The natural polymers which can be used as carriers for the new UV absorbers are principally polysaccharides such as cellulose, or also rubber and proteins.

Synthetic polymers the side chains of which have been chemically modified are principally the reaction products of polyvinyl alcohols with aldehydes such as polyvinyl butyral, and the saponification products of polyvinyl esters. Natural polymers the side chains of which have been chemically modified which can be used as carriers for the new UV absorbers are mainly cellulose esters and ethers such as cellulose esters of acetic acid, propionic acid, benzoic acid, having on the average 1 to 3 acyl groups per glucose unit.

The polymers given in the above list, either alone or in admixture, are the carriers for the new UV absorbers in the compositions of matter obtained according to the invention. Particularly valuable compositions of matter contain, as carrier for the new UV absorbers, thermoplastic vinyl and vinylidene polymers, including polyolefines, cellulose esters and ethers, linear fibre-forming polyesters, polyamides and polyurethanes, polyester resins.

In addition to these polymeric carriers, natural and also synthetic, light-sensitive waxes, fats and oils as well as complex systems such as photographic material, emulsions, which contain light-sensitive solid substances, emulsions or dispersions of the polymers mentioned above can be used as carriers for the new UV absorbers. A UV absorbent emulsion of a solution of compounds of Formula I in high boiling solvents such as dioctyl phthalate, dioctyl sebacate, or in the gelatine layer of photographic materials is given as an example.

The molecular weight of the polymers mentioned above is of secondary importance as long as it is within the limits necessary for the characteristic mechanical properties of the polymers. Depending on the polymers it can be from 1,000 to several millions. The new UV absorbers are incorporated into these polymers, for example—depending on the type of polymer—by working in at least one of these compounds and, optionally, further additives such as plasticisers, antioxidants, other UV absorbers, heat stabilisers, pigments, by the usual technical methods, into the melt before or during moulding, or by dissolving in the corresponding monomer before polymerisation, or by dissolving the polymer and the additives in solvents and subsequently evaporating the latter. The new bismethylene malonic acid derivatives can also be drawn from baths, e.g. from aqueous dispersions, onto thinner carrier structures such as films or threads.

The incorporation of the UV absorbers according to the invention into the monomer mixture of condensation polymers which split off water during the condensation at temperatures above 200° C. is to be avoided. The incorporation of the UV absorbers according to the invention into almost neutral carriers is most advantageous.

The light sensitive materials can also be protected from the injurious effect of light by giving them a protective coating containing at least one compound of Formula I as defined or by covering them, for example, with films, discs or plates containing such UV absorbers. In both these cases, the amount of UV absorber added is advantageously 10 to 30% (calculated on the protective material) for protective coatings of less than 0.01 mm. thickness and 1 to 10% for protective coatings of 0.01 to 0.1 mm. thickness.

For certain purposes, particularly when warm polymers in the form of chips have to be pulverised together with protective substances, UV absorbers which melt above the softening temperature of the polymer used and, in spite of this, are sufficiently soluble in the melted polymer, are particularly valuable.

Clearly, the preferred carriers for the new bis-methylene malonic acid derivatives of Formula I are thermoplastic materials which can be made into forms having a large surface at raised temperatures. These are in particular the polyolefines, i.e. polyethylene and the isotactic polymers derived from α-olefines, especially from alkenes having 3 to 6 carbon atoms. In addition the carriers which are distinguished by particularly slight self-colour such as polymers of esters of acrylic and methacrylic acid and polystyrene are important. A third type of carriers in which the bis-methylene malonic acid derivatives according to the invention lead to particularly good results are polymers into which heavy metal salts are incorporated as additional stabilisers or as pigments. These are mainly polymeric halogen vinyl and vinylidene compounds preferably in the form of thermoset compositions such as hard or plasticised PVC.

Because of their easy accessibility and compatability to substrates, symmetrical compounds of Formula I*a*

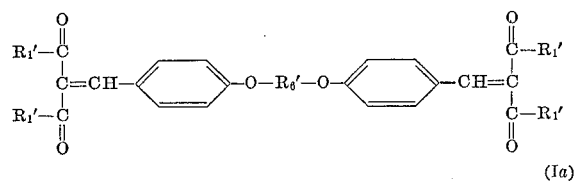

(I*a*)

wherein $R'_1$ represents an alkoxy group containing 1 to 21 C atoms and $R'_6$ represents an alkylene group containing 2 to 12 C atoms are preferred and of these, compounds in which all $R'_1$'s and $R'_6$'s together contain at least 12, preferably 20 to 86, optimally 20 to 48 carbon atoms are particularly suitable as UV absorbers for polyolefines such as polyethylene, isotactic polypropylene and isotactic poly - 4 - methylpentene-(1). Of the compounds of Formula I*a*, the esters having the same number of carbon atoms are distinguished by better compatibility. On the other hand, the amides are preferred for those purposes where particular stability to extraction is required. In this class, often the high melting compounds are preferred as they can be better mixed with, in particular, the pulverulent α-olefine polymers, than low melting or even liquid additives and thus better homogeneity of the finished products is guaranteed.

The compounds of Formula I*a* are distinguished by high absorption at short wave lengths whilst similar compounds of Formula I wherein $R_5$ or $R'_5$ is not hydrogen have weaker absorption but absorb at longer wave lengths. The good light fastness of compounds of Formula I*a* is all the more surprising since analogous cyanoacetic acid ester compounds wherein one of the radicals —$COR'_1$ is replaced by the radical —CN have very inferior fastness to light.

Particularly suitable for polyvinyl chloride are compounds of Formula I*b*

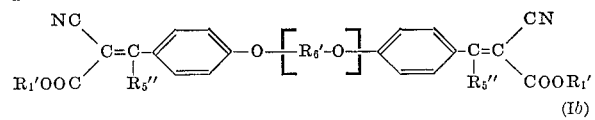

(I*b*)

wherein $R'_1$ and $R'_6$ have the meanings given in Formula I*a* and $R''_5$ represents a low alkyl group of preferably not more than 4 carbon atoms.

Compounds of Formula I*b* wherein $n=1$ are particularly advantageous.

Compounds of Formula I*c* are distinguished principally for their light fastness in oxidisable substrates:

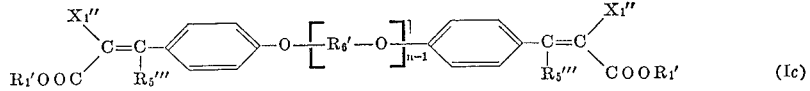

(I*c*)

In this formula:

$R_1'$ and $R_6'$ have the meanings given in Formula I*a*, $R_5'''$ represents phenyl, methylphenyl, chlorophenyl or, alkoxyphenyl, preferably lower alkoxy-phenyl, and $X_1''$ represents the group —$COOR_1'$ or —CN.

The compounds of Formula I*c* containing —CN groups are distinguished from those containing —$COOR_1'$ groups by considerably higher extinction.

Of the stabilizers which, optionally, are to be used simultaneously with the UV absorbers according to the invention, the antioxidants and synergists thereof are the most important. The aniline and naphthylamine derivatives have a good activity, e.g. phenyl-α- and -β-naphthylamine, N,N'-dibutyl-, N,N'-dioctyl-, N,N'-diphenyl- p-phenylenediamine, 2,2,4 - trimethyl - 1,2 - dihydro-quinoline, 3-hydroxy - 1,2,3,4 - tetrahydro-benzo[h]-quinoline, phenophenothiazine, N-butyl-p-aminophenol, etc. All these antioxidants containing amino groups become discoloured in the air and, therefore, are only useful for dark coloured or black compositions. Of much more importance, however, are the phenolic antioxidants which do not or only slightly become discoloured. In substrates which only have a slight tendency to autoxidation, e.g. polyvinyl chloride, often even simple phenols are sufficient such as 2,2-bis-(4-hydroxyphenyl)-propane. In substrates which are highly subject to autoxidation such as α-polyolefins which, in addition to polyethylene, embrace particularly the isotactic types derived from alkenes having more than 2 carbon atoms, as well as in the homo- and co-polymers of butadiene and/or isoprene, sterically hindered phenols have to be used as antioxidants. As examples of the most simple representatives of this class can be mentioned: 2,4-dimethyl-6-tert. butyl phenol, 2,6-di-tert.butyl-4-methyl phenol, 2 - tert.butyl - 5 - methyl di-tert.butyl-4-methyl phenol and 2,6-di-tert.butyl-4-methoxy phenol. More difficultly volatile and, therefore, preferred are mononuclear phenols substituted in the side chains such as the alkanol esters of 2,6-di-tert.butyl-4-(2-carboxyethyl) - phenol, of 3,5-di-tert.butyl-4-hydroxybenzyl phosphonic acid, 2,6-di-tert. butyl-4-dimethylaminomethyl phenol or phenols containing complex hydrocarbon substituents such as reaction products of phenol, p-cresol, m-cresol with terpenes. Difficultly volatile and, therefore, suitable, are also the polynuclear phenolic antioxidants such as 4,4'-dihydroxy - 2,2'-dimethyl-5,5'-di-tert. butyldiphenyl sulphide, 2,2'-dihydroxy-3,3'-di-tert. butyl - 5,5' - dimethyldiphenyl methane, 4-methyl-, 4-ethyl-, 4-tert. butyl)-, 4-octyl- 2,6-bis-(2-hydroxy-3-tert. butyl - 5 methylbenzyl) - phenol, 1,1-bis-(4-hydroxy-2-methyl - 5 - tert.butylphenyl)-propane, 1,1,3-tris-(4-hydroxy - 2 - methyl - 5 - tert.butylphenyl)-butane, 1,3,5-tris-(4 - hydroxy - 3,5 - tert.butylphenyl) - 2,4,6 - trimethylbenzene, 2,4,6 - tris-(4-hydroxy-3,5-tert. butylphenyl)-phenol, the triester of trimethylol propane and the tetraester of pentaerythrite with 3-(4-hydroxy-3,5-di-tert.butylphenyl)-propanoic acid or the diester of ethylene glycol with 4-hydroxy-3,5-di-tert.butylbenzoic acid, also 2,4-dioctylmercapto-6-(4-hydroxy-3,5-di-tert. butylphenylamino)-1,3,5-triazine, 2-octylmercapto-4,6-(4-hydroxy - 3,5 - di - tert. butylphenoxy)-1,3,5-triazine, or 2-(2-octylmercapto - ethylmercapto)-4,6-(4-hydroxy-3,5-di-tert.butylphenoxy)-1,3,5-triazine. In order to increase the action of these actual antioxadants, particularly when they are used in lower concentration, synergists can also be admixed into the compositions. The esters of thiodipropionic acid, particularly those of the higher fatty alcohols such as lauryl alcohol or octadecyl alcohol hav- proved to be particularly suitable. In compositions of synthetic plastics containing the UV absorbers, the antioxidants mentioned are added in amounts of 0.001 to 1 part by weight and the synergists in amounts of 0.01 to 2 parts by weight per 100 parts by weight of plastic.

To stabilize the color of plastics in a heat treatment, it is often of advantage to add, in addition to the UV absorbers, phosphites such as triphenylphosphite in amounts of 0.01 to 5 parts by weight per 100 parts by weight of plastic. This addition of phosphite can naturally also be supplemented by the admixture thereto of antioxidant and/or synergist if the substrate, in addition to heat and light sensitivity, is also subject to autoxidation.

Textile materials which can be protected against deteriorating influence of the ultra-violet portion of light by incorporating thereinto or application thereto of bis-methylene malonic acid compounds of Formula I, are crude or processed fibers such as yarns, threads or fabrics, of vegetable, animal or synthetic origin, for instance, cellulose-containing materials such as cotton, jute or sisal on the one hand, and viscose on the other hand, moreover, polyamide fibers such as wool or silk and synthetic super-polyamide fibers such as nylon 66 and nylon 6; furthermore, acrylic and vinylic fibers, especially copolymeric, acrylic fibers of improved dyeing properties, fibers from polyvinyl alcohol and modifications of such fibers having improved fastness to wet media; also fibers of vinyl chloride polymers and copolymers; polyester fibers being cellulose derivatives such as cellulose acetate or celulose propionate or super-polyester fibers, for instance poly-(ethylene glycol terephthalate) and the like fibers of glycols and organic carboxylic acids; finally, polyurethane and polycarbonate fibers can thus be protected.

Application of the compounds falling under Formula I which are to absorb fiber-deteriorating ultra-violet radiation, comprises coating of the surface of the fiber with the light-protecting agent on the one hand, and a homogeneous distribution of the light protecting agent throughout the fiber, penetration of the agent into the fiber being effected on the spun fiber. More in detail, this can be achieved by introducing the fibrous material into a liquor which contains the ultra-violet radiation-absorbing bis-methylene malonic acid compound of Formula I either in a dissolved or a finely dispersed state. Solvents or dispersion media for the last-mentioned compounds are, for instance, acetone, methylethyl ketone, methanol, ethanol, ethyl acetate, cyclohexanol, tetrahydronaphthalene, and preferably water. Dispersing agents that may be used in this liquor are suitable products conventional in the textile industry, such as soaps, alkyl and aryl sulfonates and polyethylene glycol condensation products. The textile material is left for a conventional period, ranging from about 20 minutes to 20 hours, in the liquor which can be held at a temperature ranging from about 18 to 120° C., the material being moved in the liquor if necessary. At the end of the treatment, the goods are removed from the liquor, washed if necessary, and dried at room temperature, drying being accelerated if necessary by applying a vacuum.

It is also possible to spray a solution or suspension of the ultra-violet radiation-absorbing compound, prepared with the above-mentioned solvents or dispersing agents, onto the textile materials to be protected against the detrimental effects of ultra-violet light, and then to dry the goods.

The amount of ultra-violet radiation-absorbing compound to be applied to the fibers depends on the type of textile material to be protected and on the degree of protection desired. Generally, an amount of 0.001 to 5%, and preferably of 0.1 to 4%, calculated on the weight of the fibers is satisfactory.

The following non-limitative examples illustrate the invention further. The temperatures are given therein in degrees centigrade. Percentages are given by weight lnless expressly stated otherwise.

EXAMPLE 1

A solution of 15 g. of acetyl cellulose having on the average 2.5 acetoxy groups per glucose unit, and 0.3 g. of one of the additives given in the following Table I, 2.0 g. of dibutyl phthalate and 82.7 g. of acetone is made into a film by painting onto a glass plate. After evaporation of the acetone, cellulose acetate foils are obtained which are dried first at room temperature and then in the oven at 60°. Samples of these 0.04 mm. thick foils are exposed in a fadeometer and tests from time to time for the content of UV absorber and for their brittleness. The results obtained are given in Table I.

TABLE I

| Additive | Cpd. No. | Time of exposure, hrs. | Percent of additive still present | Behaviour of foils on folding |
|---|---|---|---|---|
| (a) 1,4-bis-[4-(2,2-dicarbethoxyethenyl)-phenoxy]-butane | 1 | 24 | 100 | Foldable. |
|  |  | 100 | 99 | Do. |
|  |  | 500 | 90 | Do. |
| (b) 1,4-bis-[4-(2-cyano-2-carbethoxy-ethenyl)-phenoxy]-butane (comparative substance) | A | 24 | 20 | Do. |
|  |  | 100 | 6 | Do. |
|  |  | 500 | 0 | Brittle. |
| (c) None |  | 24 |  | Foldable. |
|  |  | 100 |  | Do. |
|  |  | 500 |  | Brittle. |

As can be seen from Table I, the additive No. 1 of the formula

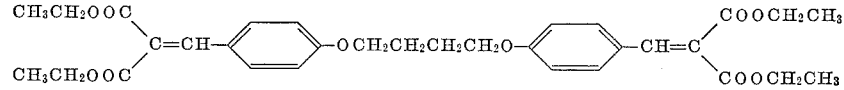

is suitable as a light-stable UV absorber whilst the closely related comparative substance A is very sensitive photolytically and is thus unsuitable as UV absorber.

Production method A

To produce UV absorber No. 1, 0.1 mol (29.8 g.) of 1,4-bis-(p-formyl-phenoxy)-butane (M.P. 103°; J. Org. Chem., 26, 475 (1961)), 0.2 mol (32.0 g.) of malonic acid diethyl ester, 0.5 g. of benzoic acid, 2 g. of piperidine and 100 ml. of benzene are heated for 14 hours in a water separator. About 3 ml. of water are distilled off. The cooled solution is filtered and the filtrate is concentrated. On triturating the honey-like residue, it crystallises. The crude product so obtained is first recrystallised from methanol and then from ligroin. It melts at 102–103° and has a maximum UV absorption at about 317 nm.

The comparative substance A is produced analogously by reacting the bis-formyl compound mentioned with cyanoacetic acid ethyl ester instead of malonic acid diethyl ester. It melts at 200°.

Other results obtained with substances according to the invention are given in Table Ia. All UV absorbers given so protect acetyl cellulose that sheets thereof can still be folded after 500 hours' exposure.

A light-protection agent of Formula I, in which $X_1$ and $X_2$ on the one hand and $X_1'$ and $X_2'$ on the other hand are different pairs of ester groups is, for example, 1-[4-(2,2-dicarbobutoxy-ethenyl)-phenoxy] - 4 - [4-(2,2-dicarbohexoxy-ethenyl)-phenoxy]-butane which is produced as follows: 0.1 mol (29.8 g.) of 1,4-bis-(p-formyl-phenoxy)-butane, 0.1 mol (21.6 g.) of dibutyl malonate and 0.1 mol (27.2 g.) of dihexyl malonate are mixed with 0.5 g. of benzoic acid and 2 g. of piperidine in 100 ml. of benzene and refluxed in a water separator for 12 hours. The reaction mixture is cooled and filtered and the filtrate is evaporated to dryness.

Chromatographic separation of the oily residue affords about equal amounts of: 1-[4-(2,2-dicarbobutoxy-ethenyl)-phenoxy]-4-[4 - (2,2 - dicarbohexoxy-ethenyl)-phenoxy]-butane, 1,4-bis-[4 - (2,2 - dicarbobutoxy-ethenyl)-phenoxy]-butane and 1,4-bis-[4-(2,2-dicarbohexoxy-ethenyl)-phenoxy]-butane.

Production method C

Compounds 12 and 14 are produced by this method which is described below for compound 12:

(a) 1,4 - bis - [4 - (phenyldichloromethyl)-phenoxy]:butane.—0.08 mol (36.0 g.) of 1,4 - bis(4-benzoylphenoxy)-butane and 0.16 mol (33.3 g.) of phosphorus pentachloride are heated for 30 minutes at 150°. The phosphorus oxychloride formed is then distilled off from the reaction mixture in vacuo and the residue is taken up in 200 ml. of hot carbon tetrachloride. When cold, the above compound crystallises out of the carbon tetrachloride extract. It melts at 114–118° with decomposition.

(b) 1,4 - bis - [4 - (1 - phenyl - 2,2 - dicarboethoxy-ethenyl)-phenoxy]-butane.—2.5 g. of pulverised magnesium filings which have been defatted with carbon tetrachloride are covered with half of a mixture obtained from 0.1 mol (16.0 g.) of malonic acid diethyl ester and 17.5 ml. of abs. ethanol. The reaction is started by the addition of 0.5 ml. of carbon tetrachloride. The reaction mixture is then brought to reflux temperature by the gradual addition of the other half of the malonic ester/ethanol mixture, and is then refluxed for 3 hours, after which excess alcohol is evaporated off in vacuo and a solution of TABLE Ia

| Additive | Compound No. | Melting point, ° | Percent of additive (present) after 500 hrs. exposure | Method |
| --- | --- | --- | --- | --- |
| (a) 1,8-bis-[4-(2,2-dicarboethoxy-ethenyl)-phenoxy]-octane | 2 | 103 | 85 | A |
| (b) 1,2-bis-[4-(2,2-dicarbobutoxy-ethenyl)-phenoxy]-ethane | 3 | 64 | 78 | A |
| (c) 1,2-bis-[4-(2,2-dicarbooctoxy-ethenyl)-phenoxy]-ethane | 4 | 65 | 70 | A |
| (d) 1,2-bis-[4-(2,2-dicarbododecyloxy-ethenyl)-phenoxy]-ethane | 5 | 79–80 | 70 | A |
| (e) 1,2-bis-[4-(2,2-dicarbomethoxy-ethenyl)-phenoxy]-ethane | 6 | 154 | 85 | A |
| (f) 1,8-bis-[4-(2,2-dicarbooctadecylo u-ethenyl)-phenoxy]-octane | 7 | 78 | 70 | A |
| (g) 1,4-bis-[4-(2,2-dicarboethoxy-ethenyl)-2-methoxy-phenoxy]-butane | 8 | 111–112 | 40 | B |
| (h) 1,4-bis-[4-(2,2-dicarboethoxy-ethenyl)-3-chlorophenoxy]-butane | 9 | 105 | 23 | B |
| (i) 1,4-bis-[4-(2,2-dicarbooctadecyloxy-ethenyl)-3-methylphenoxy]-butane | 10 | 69 | 46 | B |
| (k) p-bis-[4-(2,2-dicarboethoxy-ethenyl)-phenoxy)-methyl]-benzene | 11 | 151–152 | 80 | B |
| (l) 1,4-bis-[4-(1-phenyl-2,2 dicarboethoxy-ethenyl)-phenoxy]-butane | 12 | 141 | 90 | C |
| (m) 1,4-bis-[4-(1-phenyl-2,2-dicarbooctoxy-ethenyl)-phenoxy]-butane | 13 | 70 | 98 | D |
| (n) 1,8-bis-[4-(1-phenyl-2,2 dicarboethoxy-ethenyl)-phenoxy]-octane | 14 | 125 | 88 | C |
| (o) sebacic-acid-bis-(4-(2,2-dicarbomethoxy-ethenyl)-anilide] | 15 | 185 | 60 | E |
| (p) 1,4-bis-[4-(1-methyl-2-cyano-2-carbomethoxy-ethenyl)-phenoxy]-butane | 16 | 139 | 78 | F |
| (q) 1,4-bis-[4-(1-phenyl-2-cyano-2-carboethoxy-ethenyl)-phenoxy]-butane | 17 | 163 | 60 | G |
| (r) p-bis-[4-(1-methyl-2-cyano-2-carboethoxy-ethenyl)-phenoxy]-methyl]-benzene | 18 | 157 | 84 | F |
| (s) p,p'-bis-(1-methyl-2-cyano-2-carbomethoxy-ethenyl)-diphenyloxide | 19 | 142 | 89 | F |
| (t) p,p'-bis-(1-methyl-2-cyano-2-carbododecyloxy-ethenyl)-diphenyloxide | 20 | 58–60 | 90 | F |
| (u) p,p'-bis-(1-phenyl-2-cyano-2-carboethoxy-ethenyl)-diphenyloxide | 21 | 140 | 87 | G |

Compounds 2–7 are also produced according to the above method A.

Production method B

Compounds 8–11 are produced by this method. The synthesis of Example 9 is given as an example:

(a) 4 - (2,2-dicarboethoxy-ethenyl)-3-chlorophenol.—0.1 mol (15.7 g.) of 4-hydroxy-3-chlorobenzaldehyde, 0.1 mol (16.0 g.) of malonic acid diethyl ester, 3 ml. of piperidine, 0.8 g. of benzoic acid and 200 ml. of benzene are boiled for 10 hours in a water separator. The benzene solution is evaporated to dryness. When recrystallised from toluene, the residue obtained melts at 114°.

(b) 1,4-bis-[4-(2,2-dicarboethoxy-ethenyl) - 3 - chlorophenoxy]-butane.—0.05 mol (14.7 g.) of the compound produced under (a) are dissolved in 100 ml. of cold dimethyl formamide. 0.05 mol (2.7 g.) of dry sodium methylate and a pinch of sodium iodide are added to this solution. The solution is then heated to 50–60° and 0.025 mol (5.4 g.) of 1,4-dibromobutane are added within 5 minutes. The reaction mixture is then refluxed for 45 minutes. After cooling the reaction mixture, it is poured into 300 ml. of water, the precipitate formed is filtered off under suction, washed with water and recrystallised, first from ethanol and then from ligroin. The compound 9 so obtained melts at 105°.

In the production of compound 11, N-methyl pyrrolidone is used as solvent instead of dimethyl formamide.

0.05 mol (28.0 g.) of the compound produced under (a) above in 100 ml. of dry xylene is added to the 50° warm residue. When the exothermic reaction has subsided, the mixture is heated for another 2 hours at 120°, then cooled and 200 ml. of 10% sulphuric acid are added. The xylene phase is separated from the aqueous phase, washed neutral with water, dried over sodium sulphate and concentrated. Recrystallised from ethanol and toluene, the above compound melts at 141°.

Production method D

Compound No. 13 is produced by this method by transesterification of compound 12 with n-octanol.

0.01 mol (7.35 g.) of compound 12, 0.05 mol (6.5 g.) of n-octanol and 0.1 g. of sodium methylate are heated for 2 hours in vacuo at 120°. The hot reaction mixture is taken up in 100 ml. of ligroin, filtered and the filtrate is evaporated to dryness. Compound 13 is obtained as residue which, when recrystallised twice from hexane, melts at 70°.

Production method E

Compound 15 is produced by this method as follows:

(a) Sebacic acid - bis - (4 - formyl-anilide).—0.2 mol (24.2 g.) of p-aminobenzaldehyde (produced from p-nitrotoluene according to Org. Synth., 31, 6 (1951)) are dissolved in 100 ml. of pyridine, 0.1 mol (23.9 g.) of sebacic acid dichloride are added to this solution dropwise while cooling. The reaction mixture is stirred for 1 hour at room temperature, heated for 5 minutes at 80°, cooled and then 200 ml. of water are added. The precipitate formed is filtered off, washed with water and recrystallised from ethanol and then from glacial acetic acid. The compound so obtained melts at 138–140°.

(b) Sebacic acid-bis-[4-(2,2-dicarboethoxy - ethenyl)-anilide].—0.025 mol (10.2 g.) of sebacic acid-bis-(4-formyl-anilide), 0.05 mol (6.6 g.) of malonic acid dimethyl ester, 1 g. of piperidine and 0.2 g. of benzoic acid in 100 ml. of benzene are boiled for 12 hours in a water separator. The reaction solution is cooled whereupon the compound crystallises out in the form of pale yellow needles. On recrystallising from methylethyl ketone, these melt at 185°.

Production method F

Compounds 16, 18, 19 and 20 are produced by this method by reaction of Schiff's bases with the corresponding cyanoacetic acid esters. The production of compound 19 is given in detail.

p,p'-Bis(1 - methyl - 2 - cyano - 2 - carbomethoxy-ethenyl)-diphenyl oxide.—0.1 mol (25.4 g.) of p,p'-diacetyl diphenyl oxide (M.P. 102°, J. Or. Chem. [2], 117, 350 (1927)), 0.22 mol (21.8 g.) of cyclohexylamine and 2 mol of glacial acetic acid in 250 ml. of benzene are refluxed for 18 hours in a water separator. The solution of the Schiff's base formed is cooled and a mixture of 0.22 mol (21.8 g.) of cyanoacetic acid methyl ester and 13.5 ml. of glacial acetic acid is added within 1 hour. The reaction mixture is then heated for 2 hours at 60°, then cooled and the voluminous precipitate formed is filtered off under suction. The cyclohexyl ammonium acetate is washed out of the filter residue with hot water and the insoluble residue is recrystallised from glacial acetic acid and then from toluene. Compound 19 so obtained melts at 142°.

Compound 16 is produced analogously from 1,4-bis-(4-acetylphenoxy)-butane.

1,4-bis - (4 - acetyl-phenoxy)-butane.—0.2 mol (27.2 g.) of p-hydroxyacetophenone and 4.6 g. of sodium are dissolved in 200 ml. of abs. ethanol. 0.1 mol (21.6 g.) of 1,4-dibromobutane are added dropwise to this solution at room temperature. The reaction mixture is refluxed for 4 hours, then poured into 1000 ml. of ice water and the white precipitate formed is filtered off under suction, washed with water and recrystallised from methyl Cellosolve. The above compound, when so obtained, melts at 149°.

Production method G

Compounds 17 and 21 are obtained by way of the corresponding ketimines. This method is illustrated for compound 21:

(a) p,p'-Bis-(phenyliminomethyl) - diphenyl oxide.—A solution of 0.1 mol (48.8 g.) of p,p'-bis-(phenyldichloromethyl)-diphenyl oxide (produced according to method C(a)) in 200 ml. of dry chloroform is added dropwise to 500 ml. of liquid ammonia at −50°. The reaction mixture is then gradually heated to room temperature and is stirred until all the ammonia has evaporated. The ammonium chloride formed is filtered off and the filtrate is concentrated whereupon the above oxide is obtained as residue. Recrystallised from benzene it melts at 138°.

(b) p,p'-Bis - (1 - phenyl - 2 cyano - 2 - carboethoxy-ethenyl)-diphenyl oxide.—0.01 mol (3.8 g.) of the compound obtained under (a) and 0.02 mol (2.3 g. of cyanoacetic acid ethyl ester in 100 ml. of abs. ethanol are refluxed for 12 hours. On cooling the reaction solution, a honey-like mass separates out which, on triturating with glacial acetic acid, crystallises. The above diphenyl oxide so obtained melts at 140° after one recrystallisation from toluene.

EXAMPLE 2

0.5% by weight of an additive given in Table II are added to difficultly combustible liquid polyester resin and the mixture together with 1% by weight of benzoyl peroxide is polymerised at 80° into 2.5 mm. thick plates. The plates are subsequently cured at 120°.

After exposure, plates so produced turn considerably less brown than plates produced without the additives above mentioned when they are exposed under the same conditions.

The polyester resin used is produced as follows: A mixture of 343 g. of maleic acid anhydride and 428 g. of tetrachlorophthalic acid anhydride is added in portions to an 80° hot mixture of 170 g. of ethylene glycol and 292 g. of diethylene glycol. After replacing the air in the reaction vessel by nitrogen, the temperature is raised to 150° within 1 hour, then to 210° within 9 hours and so maintained for 1 hour. The mass is then cooled to 180°, a vacuum pump is connected and the pressure is slowly reduced to 100 torr. These conditions are maintained until the acid number of the reaction mixture has fallen below 50.

100 g. of the polester so obtained are mixed with 50 g. of styrene and the mixture is polymerised under the conditions described above.

Similar results are obtained if, instead of tetrachlorophthalic acid, the equivalent amount of phthalic acid anhydride is used. The resultant polyester resin in this case however is not difficultly combustible.

If in the procedure described above, the styrene is replaced by methylmethacrylate, then plates are obtained which in themselves tend to turn brown less and, in addition, can be more easily stabilised.

TABLE II

| Additive | Cpd. No. | Method |
|---|---|---|
| (a) 1,4-bis-[4-(2,2-dicarbooctadecyloxyethenyl)-phenoxy)-butane | 22 | B |
| (b) 1,4-bis-[4-(2,2-dicarbotetradecyloxyethenyl)-phenoxy]-butane | 23 | B |
| (c) 1,4-bis-[4-(2,2-bis-morpholinocarbonylethenyl)-phenoxy]-butane | 24 | A |
| (d) 1,4-bis-[4,2,2-dicarbo-(2-methoxyethoxy)-ethenyl]-phenoxy]-butane | 25 | B |
| (e) 1,4-bis-[4-[2,2-dicarbo-(2-hydroxyethoxy)-ethenyl]-phenoxy]-butane | 26 | B |
| (f) 1,4-bis-[4-(2,2-dicarbomethoxyethenyl)-phenoxy]-butane | 27 | B |
| (g) 1,8-bis-[4-(2,2-dicarboethoxyethenyl)-phenoxy]-octane | 2 | B |
| (h) 1,8-bis-[4-(2,2-dicarboethoxyethenyl)-3-chlorophenoxy]-octane | 28 | B |
| (i) 1,8-bis-[4-(2,2-dicarboethoxyethenyl)-3-methylphenoxy]-octane | 29 | E |
| (k) 1,8-bis-[4-(2,2-dicarboethoxyethenyl)-3-methoxyphenoxy]-octane | 30 | B |

Compound No. 22 is produced as follows by the method B:

(a) Production of the malonic acid dioctadecyl ester.—0.54 mol (56.9 g.) of malonic acid, 1.1 mol (297 g.) of stearyl alcohol and 500 ml. of benzene are boiled for 20 hours in a water separator and then, in all, 15 g. of p-toluene sulphonic acid are added in portions every two hours. 20 ml. of water are separated. The benzene solution obtained is cooled with ice and the ester which separates is filtered off under suction. On recrystallising from acetone, 77% of the theoretical amount of pure malonic acid dioctadecyl ester is obtained (M.P. 60°).

(b) Production of p-(2,2-dicarbooctadecyloxy-ethenyl)-phenol.—0.2 mol (24.5 g.) of p-hydroxybenzaldehyde, 0.2 mol (121.5 g.) of malonic acid dioctadecyl ester, 5 ml. of piperidine, 1 g. of benzoic acid and 300 ml. of benzene are boiled for 12 hours in a water separator. 8.5 ml. of water are removed. The benzene solution obtained is concentrated in vacuo. The residue is recrystallised from acetone and then melts at 69°.

(c) Production of 1,4-bis-[4-(2,2-dicarbooctadecyloxy-ethenyl)-phenoxy]-butane.—0.06 mol (42.7 g.) of the above phenol, 0.06 mol (3.24 g.) of anhydrous sodium methylate and a pinch of sodium iodide are added one after the other to 100 ml. of cold dimethyl formamide. The mixture is heated to 50–60° and 0.03 mol (6.5 g.) of dibromobutane are added within 5 minutes. On completion of the addition, the reaction mixture is refluxed for 45 minutes, then cooled with ice, and acetone is added dropwise while stirring until the precipitate, which at first was amorphous, crystallises. The crude, 1,4-bis-[4-(2,2-dicarbooctadecyloxy-ethenyl)-phenoxy]-butane is filtered off under suction and recrystallised from methylethyl ketone. In this way 19 g. of pure product are obtained; M.P. 82° (not sharp).

The compounds Nos. 23–27 are obtained analogously by the method B, the corresponding malonic acid derivatives being used as starting materials. When producing malonic acid di(β-hydroxyethyl)-ester, the use of a great excess of ethylene glycol is recommended.

Compound No. 2 is produced as follows by the method B:

(a) 0.5 mol (61 g.) of p-hydroxybenzaldehyde, 0.5 mol (80 g.) of malonic acid diethyl ester, 4 ml. of piperidine and 1 g. of benzoic acid are boiled in 500 ml. of benzene for 14 hours in a water separator. 8.6 ml. of water are separated. The benzene solution obtained is filtered and concentrated. The residue becomes solid on rubbing with a little ethanol. The p-hydroxybenzylidene malonic acid diethyl ester is recrystallised from ethanol and melts at 93°. Yield about 56%.

(b) 0.1 mol (26.4 g.) of p-hydroxybenzylidene malonic acid diethyl ester, then 0.1 mol (27.2 g.) of 1,8-dibromooctane and a pinch of potassium iodide are added one after the other to a cold ethylate solution prepared from 2.3 g. of sodium metal and 200 ml. of ethanol. The orange red solution obtained is refluxed for 14 hours whereupon its colour slowly changes to yellow-orange. After removal of the ethanol and rubbing the residue, a crystalline mass is obtained from which, by washing with water and recrystallising from ethanol, 1,8-bis-[4-(2,2-dicarboethoxy-ethenyl)phenoxy]-octane is obtained, M.P. 102–103°. There is a great depression of the melting point when it is mixed with compound 1 of Example 1 which, by chance, has a similarly high melting point.

The compounds Nos. 28–30 are produced analogously to compound No. 2 by the method B. Instead of p-hydroxybenzaldehyde, an equivalent amount of 4-hydroxy-3-chlorobenzaldehyde, 4-hydroxy-3-methyl benzaldehyde or 4-hydroxy-3-methoxybenzaldehyde respectively is used.

Compound No. 24 is produced by the method A. It crystallises with 1½ mols of water. It begins to melt at 85°.

EXAMPLE 3

100 parts of methacrylic acid methyl ester, 0.5 part of an additive given in Table III and 0.2 part of lauroyl peroxide are mixed and the mixture is polymerized at a temperature of 50–70° into sheets of 2 mm. thickness.

As can be seen from the following table, such sheets can be used as colourless UV filters.

TABLE III

| Additive | Cpd. No. | Percent transmission of light of wavelength | | Method |
|---|---|---|---|---|
| | | 340 nm. | 430 nm. | |
| (a) p-bis-[[4-(2,2-dicarboethoxyethenyl)-phenoxy]-methyl]-benzene | 11 | 1 | 92 | B |
| (b) 1,4-bis-[[4-(2,2-dicarboethoxyethenyl)-phenoxy]-methyl]-cyclohexane (mixture of cis and trans) | 31 | 1 | 92 | B |
| (c) 1,4-bis-[4-(2,2-dicarboethoxyethenyl)-phenoxy]-butane | 1 | 1 | 92 | A |
| (d) 1,12-bis-[4-(2,2-dicarboethoxyethenyl)-phenoxy]-dodecane | 32 | 1 | 92 | B |
| (e) 1,8-bis-[4-(2,2-dicarboethoxyethenyl)-phenoxy]-3,6-dithiaoctane | 33 | 1 | 92 | B |
| (f) None | | 86 | 92 | |

The compound No. 11 is produced as follows by the method B:

A solution of 0.02 mol (5.28 g.) of p-hydroxybenzylidene malonic acid diethyl ester (produced according to Example 2(a)), 0.02 mol (1.08 g.) of sodium methylate and 0.01 mol (2.6 g.) of p-xylidene dibromide in 70 ml. of N-methyl pyrrolidone is heated for 1 hour at 130° whereupon the colour which was initially red changes to pale yellow. After cooling the reaction mixture with ice while stirring well, the pale yellow crystals of crude p-bis-[[4-(2,2-dicarboethoxy-ethenyl)-phenoxy]-methyl] - benzene which precipitate are filtered off under suction, washed with water and recrystallised from ethanol and then from toluene. The colourless crystals so obtained melt at 151–152°.

The compounds Nos. 31–33 are obtained analogously if, instead of p-xylidene dibromide, an equivalent amount of the mixture of the cis-trans isomers of 1,4-dibromomethyl-cyclohexane (obtained from the corresponding alcohol with HBr), of 1,12-dibromo-dodecane or of 3,6-dithiaoctane-1,8-bis-p-toluene sulphonate is used.

EXAMPLE 4

A mixture of 600 g. of pulverulent emulsion polyvinyl chloride (K value 72, bulk density 0.43), 330 g. of dioctyl phthalate and 10 g. of an additive given in Table IV are worked up into foils on a set of two mixing rollers at 150°.

On exposing foils so produced, brown spots only appear after 1.5 to 2 times longer time than they appear on similar foils produced without the addition of the substances of Table IV.

Similar results are obtained if polyvinyl chloride having a K value of 74 and bulk density of 0.46 is used.

The addition of 10 g. of barium-cadmium laurate to the mixture mentioned in the first paragraph of this example produces foils which are stabilised to the effects of heat and light also.

TABLE IV

| Additive | Cpd. No. | Method |
|---|---|---|
| (a) 1,4-bis-[4-(2,2-bis-ethylaminocarbonyl-ethenyl)-phenoxy]-butane | 34 | A |
| (b) p,p'-bis-(2,2-dicarboethoxyethenyl)-diphenyloxide | 35 | A |
| (c) 1,2-bis-[4-(2,2-dicarbobenzyloxyethenyl)-phenoxy]-ethane | 36 | A |
| (d) 1,2-bis-[2-2,dicarbo-(2-benzyloxyethoxy)-ethenyl]-phenoxy]-ethane | 37 | A |
| (e) 1,4-bis-[4-(2,2-dicarbomethoxy-ethenyl)-phenoxy]-butane | 38 | A |
| (f) 1,2-bis-[4-(2,2-dicarboethoxyethenyl)-phenoxy]-ethane | 39 | A |
| (g) p,p'-bis-(1-methyl-2-cyano-2-carbomethoxy-ethenyl)-diphenyloxide | 19 | F |
| (h) p,p'-bis-(1-methyl-2-cyano-2-carbooctadecyloxy-ethenyl)-diphenyloxide | 40 | F |
| (i) p,p'-bis-(1-n-nonyl-2-cyano-2-carboethoxy-ethenyl)-diphenyloxide | 41 | F |
| (k) 1,4-bis-[4-(1-methyl-2-cyano-2-carbomethoxy-ethenyl)-phenoxy]-butane | 16 | F |

To produce the UV absorber No. 34 by the method A 0.1 mol (29.8 g.) of 1,4-bis-p-formyl-phenoxy-butane, 0.2 mol (31.6 g.) of malonic acid bis-ethylamide, 0.5 g. of benzoic acid, 2 g. of piperidine and 200 ml. of benzene are boiled for 14 hours in a water separator. (The malonic acid bis-ethylamide is obtained by reacting malonic acid ethyl ester with ethylamine, M.P. 148°.) From the cooled solution the 1,4-bis[4-(2,2-bis-ethyl-aminocarbonylethenyl)-phenoxy]-butane is filtered off and recrystallised from chlorobenzene (M.P. 214°).

The compounds Nos. 35–39 are produced in a corresponding way by reacting equimolar amounts of p,p'-bis-formyl-diphenyl ether (M.P. 55°, CA, 59, 11465e), 1,2-bis-p-formyl-phenoxy-ethane (M.P. 123°, J. Org. Chem., 26, 475 (1961)) instead of the 1,4-bis-p-formylphenoxy butane used with the corresponding amounts of malonic acid esters in an analogous way.

The compounds Nos. 40–41 are produced by the method F.

EXAMPLE 5

Polyethylene of medium molecular weight 28,000 and a density of 0.917 is mixed at 180° in a Brabender plastograph with 1% of its total weight of an additive of Table V and 0.5% of 4-(2-carbooctadecyloxyethyl)-2,6-di-tert.-butyl phenol. The mass obtained is then pressed in a plate press at 165° into 1 mm. thick plates.

On weathering, these plates have considerably less tendency to brittleness than those without the addition of the additives mentioned.

Similar results are obtained if, instead of the polyethylene, polypropylene is used; this must then be mixed at 220° and pressed at 180°. If instead of 4-(2-carbooctadecyloxyethyl)-2,6-di-tert.butyl phenol, 0.5% of 4-hydroxy-3,5-di-tert.butyl-benzyl-di-tert.octadecyl phosphonate is used, then with otherwise the same procedure as given above, similar results are obtained.

TABLE V

| Additive | Cpd. No. | Method |
|---|---|---|
| (a) 1,4-bis-[4-(2,2-dicarbotetradecyloxy-ethenyl)-phenoxy]-butane | 23 | B |
| (b) 1,4-bis-[4-(2,2-dicarbooctadecyloxy-ethenyl)-phenoxy]-butane | 22 | B |
| (c) 1,6-bis-[4-(2,2-dicarbooctadecyloxy-ethenyl)-phenoxy]-hexane | 42 | B |

The compound No. 23 is produced as follows by the method B: 0.1 mol (5.4 g.) of sodium methylate and a pinch of potassium iodide are added to 0.1 mol (60 g.) of p-(2,2-dicarbotetradecyloxy-ethenyl)-phenol [produced analogously to Example 2(b)), M.P. 49–50°] in 200 ml. of dimethyl sulphoxide and 0.05 mol (10.8 g.) of dibromobutane are added dropwise to the solution obtained at 50°, the addition being made within 1 hour. After stirring for 8 hours at 40–50°, the dimethyl sulphoxide is evaporated off in vacuo. The residue is taken up in acetone, precipitated sodium bromide is filtered off from the hot solution, the filtrate is cooled and the precipitated 1,4-bis-[4-(2,2-dicarbotetradecyloxy-ethanyl)-phenoxy]-butane is recrystallised from hexane. It melts at 80°.

The compound No. 42 is obtained if, instead of p-(2,2-dicarbotetradecyloxy-ethyl)-phenoxy]-butane is recrys- the p-(2,2-di-carbooctadecyloxy-ethenyl)-phenol described under 2(b) is condensed in an analogous way with 0.05 mol (12.2 g.) of 1,6-dibromohexane.

EXAMPLE 6

Polypropylene of medium molecular weight 60,000 and a density of 0.96 is mixed at 220° in a Brabender plastograph with 1% of its total weight of an additive of Table VI, 0.2% of bis-(4-hydroxy-2-methyl-5-tert.butyl)-phenyl sulphide, 0.2% of dilauryl thiodipropionic acid and 0.2% of tri-octadecyl phosphite. The mass so obtained is pressed in a plate press at 180° into 1 mm. thick plates.

On weathering, the plates so obtained have a considerably less tendency to brittleness than those without the addition of the additive of Table VI mentioned.

Similar results are obtained if, instead of the bis-(4-hydroxy-2-methyl-5-tert.butyl-phenyl)-sulphide, 1,1,3-tris-(4-hydroxy-5-tert.butyl-2-methyl-phenyl)-butane is used.

TABLE VI

| Additive | Cpd. No. | Method |
|---|---|---|
| (a) 1,2-bis-[4-(2,2-dicarbooctadecyloxy-ethenyl)-phenoxy]-ethane | 43 | B |
| (b) p-bis-[[4-(2,2-dicarbooctadecyloxy-ethenyl)-phenoxy]-methyl]-benzene | 44 | B |
| (c) 1,8-bis-[4-(2,2-dicarbohexadecyloxy.ethenyl)-phenoxy]-3,6-dithia-octane | 45 | B |

Compound No. 43 is produced by condensing 0.02 mol (14.4 g.) of the phenol produced according to Example 2(b) with 0.01 mol (1.9 g.) of ethylene bromide in 30 ml. of dimethyl formamide in the presence of 1.1 g. of sodium methylate and a pinch of sodium iodide according to method B. The solvent is evaporated to dryness in vacuo and the residue is recrystallised twice from hexane. The compound No. 43 melts at 73°.

EXAMPLE 7

Polystyrene granulate and 0.2% of a UV absorber of Table VII and 0.1% of tri-tert.butyl phenol are mixed in a dry state and then the mixture is moulded into 2 mm. thick plates in an injection moulding machine.

After exposing the plates in a fadeometer for 2000 hours the plates containing these UV absorbers of Table VII practically do not become yellow and they are not brittle whilst the unprotected samples clearly turn yellow and become brittle.

Similar results are obtained if, instead of 0.1% of tri-tert.butyl phenol, 0.1% of 2,6-di-tert.butyl-4-(carbooctadecyloxyethyl)-phenol are used.

TABLE VII

| Additive | Cpd. No. |
|---|---|
| (a) 1,4-bis-[4-(2,2-dicarboethoxy-ethenyl)-phenoxy]-butane | 1 |
| (b) 1,2-bis-[4-(2,2-dicarboethoxy-ethenyl)-phenoxy]-ethane | 39 |
| (c) p-bis-[4-(2,2-dicarboethoxy-ethenyl)-phenoxy]-methyl]-benzene | 11 |
| (d) 1,8-bis-[4-(2,2-dicarboethoxy-ethenyl)-phenoxy]-octane | 2 |

EXAMPLE 8

Bleached maple veneer is painted with a lacquer for wood of the following composition:

15.0 parts by weight of cellulose acetate Cellit F900 (Bayer, Leverkusen, Germany, having about 56% acetic acid content), 10.0 parts by weight of dimethyl glycol phthalate, 2.25 parts by weight of compound No. 11 p-bis-[4-(2,2-dicarboethoxyethenyl) - phenoxy] - methyl - benzene (corresponding to 15% by weight, calculated on the cellulose acetate), 5.0 parts by weight of methyl alcohol, 10.0 parts by weight of toluene, and 50.0 parts by weight of ethyl acetate.

The natural yellowing of the wood is retarded by this lacquer.

EXAMPLE 9

Bleached maple veneer is painted with a lacquer of the following composition:

16.0 parts by weight of Acronal 4F (BASF) [poly-(butyl-acrylate)]
16.0 parts by weight of nitrocellulose E620, 35% butanol moist (medium viscosity)
2.25 parts by weight of compound No. 21 p,p'-bis-(1-phenyl-2-cyano-2-carboethoxy-ethenyl)-diphenyl oxide,
44.0 parts by weight of butyl acetate, and
24.0 parts by weight of toluene.

The natural yellowing of the wood is retarded by this lacquer. Similar good results are obtained on using 1,2-bis - [4 - (1 - phenyl - 2 - cyano - 2 - carbomethoxy - ethenyl)-phenoxy]-ethane (compound No. 46) instead of compound 21.

EXAMPLE 10

One part of 1,8-bis-[4-(2,2-di-ethoxycarbonylethenyl)-phenoxy]-octane is dissolved in 50 parts of acetone and the resulting solution is added with good stirring to a 40°-warm mixture of 5000 parts of water and 5 parts of oleyl methyl-tauride.

100 parts of acetate rayon yarn are introduced into this liquor and the temperature of the latter is raised to 80° within 30 minutes. The yarn is treated for 45 minutes at this temperature, then withdrawn from the liquor, rinsed with water and dried.

As compared with non-treated rayon, the treated yarn shows increased light stability.

EXAMPLE 11

One part of 1,4-bis-{4-[2,2-di-(2-methoxy-ethoxy-carbonyl)-ethenyl]-phenoxy}-butane is dissolved in 50 parts of acetone and the resulting solution is added with good stirring to a 40°-warm mixture of 5000 parts of water and 5 parts of tetradecyl-heptaethylene-glycol ether.

100 parts of nylon 66 yarn are introduced into this liquor and the temperature of the latter is raised to 95° within 30 minutes. After the yarn has been treated at a temperature of 95 to 100° for about 30 minutes it is withdrawn from the liquor, rinsed with water and dried.

Compared with non-treated nylon 66, the resulting treated yarn shows increased light resistance.

We claim:

1. A compound of the formula

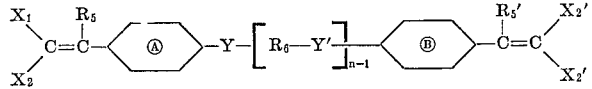

wherein each of $X_1$ and $X_1'$ are —CN; and each of $X_2$ $X_2$ and $X_2'$ are —CN or the grouping —C,—$R_1$ in which grouping $R_1$ represents one of the following:

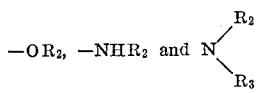

each of $R_2$ ann $R_3$ represents a member selected from among unsubstituted alkyl of from 1 to 22 carbon atoms, oxaalkyl of from 3 to 21 carbon atoms, dioxaalkyl of from 5 to 23 carbon atoms, hydroxyalkyl of from 2 to 12 carbon atoms, hydroxyoxaalkyl of from 4 to 12 carbon atoms, alkenyl of from 3 to 18 carbon atoms, cycloalkyl of from 5 to 6 ring members and a total of at most 12 carbon atoms, benzyl, aryl-substituted alkyl of a total of from 8 to 24 carbon atoms wherein the aryl moiety is selected from among phenyl, alkyl-substituted phenyl and oxaalkyl-substituted phenyl, aryl-substituted monooxa-alkyl of a total of from 9 to 24 carbon atoms wherein the aryl moiety is phenyl or alkyl-substituted phenyl, phenyl, alkyl-phenyl of from 7 to 20 carbon atoms, oxaalkyl-phenyl of from 7 to 20 carbon atoms;

each of Y and Y' represents a member selected from among —O—, —NHCO—, —NHSO$_2$ and

—NHCOO— the latter three members being bound by their nitrogen atom to rings A and B, respectively;

each of $R_5$ and $R_5'$ represents phenyl, alkyl-phenyl of from 7 to 18 carbon atoms oxy-alkyl-phenyl of from 7 to 18 carbon atoms, alkyl of from 1 to 5 carbon atoms, phenylalkyl of maximally 10 carbon atoms, or alkyl-phenyl-alkyl of maximally 19 carbon atoms, each of $R_2$ and $R_3$ being free from the atomic configurations

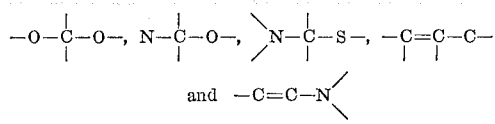

$R_6$ represents alkylene of from 2 to 12 carbon atoms, monooxaalkylene of from 4 to 12 carbon atoms, monothia-alkylene of from 4 to 12 carbon atoms, dioxa-alkylene of from 6 to 14 carbon atoms, dithia-alkylene of from 6 to 14 carbon atoms, cycloalkylene of from 4 to 12 carbon atoms, aralkylene of from 8 to 22 carbon atoms, oxaaralkylene of from 9 to 21 carbon atoms;

any hetero atom of $R_6$ being separated by at least two carbon atoms from the next adjacent hetero atoms in Y and Y' and from any other hetero atom in $R_6$ and the hetero atom of Y nearest $R_6$ being separated from the hetero atom of Y' nearest $R_6$ by at least two carbon atoms;

from 0 to 1 of the hydrogen atoms in each of the benzene rings A and B being replaced by one of the following: fluorine, chlorine, bromine, alkyl of from 1 to 5 carbon atoms, lower alkoxy of from 1 to 8 carbon atoms;

when Y is —O—, n represents 1 or 2 and in all other cases n represents 2.

2. A compound as defined in claim 1, wherein the total number of carbon atoms contained in $X_1$, $X_2$, $X_1'$, $X_2'$, $H_5$, $R_5'$ and $R_6$ together does not exceed 86.

3. A compound as defined in claim 2, which is of the formula

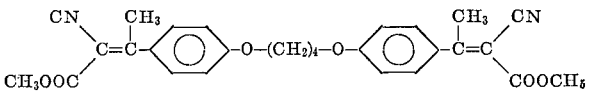

4. A compound as defined in claim 2, which is of the formula

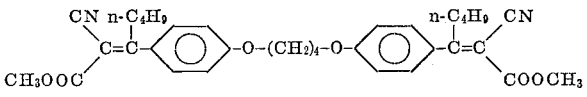

5. A compound as defined in claim 2, which is of the formula

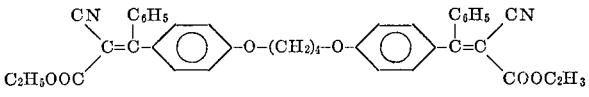

6. A compound as defined in claim 2, which is of the formula

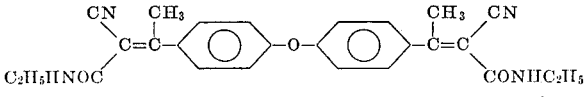

7. A compound as defined in claim 1, wherein n is 1, Y is —O—, each of $X_1$ and $X_1'$ is —CN, and each of $X_2$ and $X_2'$ is $-CO-OR_2$ wherein $R_2$ is alkyl of from 1 to 18 carbon atoms or lower alkoxy-alkyl wherein the alkyl moiety has from 2 to 5 carbon atoms, each of $R_5$ and $R_5'$ is methyl or phenyl.

8. A compound as defined in claim 7, which is of the formula

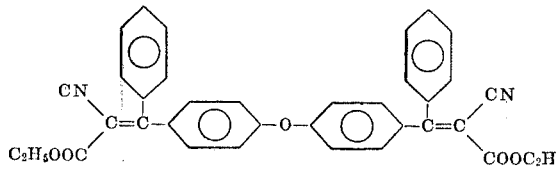

9. A compound as defined in claim 7, which is of the formula

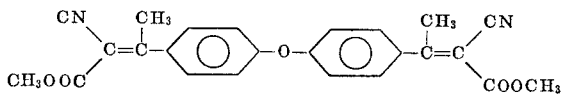

10. A compound as defined in claim 7, which is of the formula

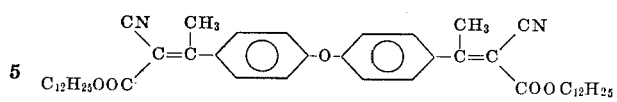

References Cited
UNITED STATES PATENTS

| | | | |
|---|---|---|---|
| 3,069,456 | 12/1962 | Strobel et al. | 260—465 |
| 3,174,937 | 3/1965 | Strobel et al. | 260—465X |
| 3,215,725 | 11/1965 | Strobel et al. | 260—465 |
| 3,272,855 | 9/1966 | Strobel et al. | 260—465 |
| 3,313,829 | 9/1967 | Rosenblatt et al. | 260—465X |
| 3,405,161 | 10/1968 | Proper et al. | 260—465 |

CHARLES B. PARKER, Primary Examiner

D. H. TORRENCE, Assistant Examiner

U.S. Cl. X.R.

8—115.6; 96—109; 106—169, 170, 176, 178, 179, 181, 186, 243, 244, 263, 270; 117—138.5, 138.8, 139, 141, 144, 147; 252—300; 260—45.8, 45.85, 45.9, 239, 240, 243, 247.2, 247.7, 294, 294.3, 294.7, 302, 307, 326.3, 326.5, 465.4, 471, 473, 475, 485, 503, 505, 512, 513, 556, 558, 559, 561, 562

UNITED STATES PATENT OFFICE
CERTIFICATE OF CORRECTION

Patent No. 3,546,270          Dated December 8, 1970

Inventor(s) Rudolf Kirchmayr, Hans Jakob Peterli, Hansjorg Heller

It is certified that error appears in the above-identified patent and that said Letters Patent are hereby corrected as shown below:

Column 3 lines 70-75  "$CH_2-C\!\!<$" should read -- $CH_2-CH\!\!<$ --

Column 4 line 10  "$-C\!\!<^{(CH_2)_4}_{(CH_2)_4}$" should read -- $CH\!\!<^{(CH_2)_4}_{(CH_2)_4}$ --

Column 9 No. 172 "p-tetrodecyloxyphenyl" should read
        -- p-tetradecyloxyphenyl --

Column 11 No. 303  "2-chloro-4-hydroxybenzaldehyde" should re
        -- 3-chloro-4-hydroxybenzaldehyde --

Column 12 No. 336  "$\alpha$-carboethoxy-$\beta$-p-hydroxyphenyl)acrylic'
        should read -- $\alpha$-carboethoxy-$\beta$-(p-hydroxypheny
        acrylic --

Column 12 line 42  "1,4-bis-[4-(2,2-dicarbooctadecyloxyethyle
        should read  -- 1,4-bis-[4-(2,2-dicarbooctadecyloxy
        ethenyl)- --

Column 16 line 60  "4-tert.butyl-" should read -- 4-tert.bu

Column 18 line 24  "Inless" should read -- unless --

Columns 19-20 Table 1a  "(q) % of additive 60" should read
        -- (q) % of additive 90 --

UNITED STATES PATENT OFFICE
CERTIFICATE OF CORRECTION

Patent No. 3,546,270        Dated December 8, 1970

Inventor(s) Rudolf Kirchmayr, Hans Jakob Peterli, Hansjorg Heller

It is certified that error appears in the above-identified patent and that said Letters Patent are hereby corrected as shown below:

Column 27 line 57 " $-C,-R_1$ " should read -- $-CO-R_1$ --

Column 28 line 20 " $-C=C-C-$ " should read -- $-C=C-O-$ --

Column 28 line 48 " $H_5, R_5'$ " should read -- $R_5, R_5'$ --

Column 28 line 67 that portion of the formula " $COOC_2H_3$ "

should read -- $COOC_2H_5$ --

Signed and sealed this 6th day of June 1972.

(SEAL)
Attest:

EDWARD M. FLETCHER, JR.
Attesting Officer

ROBERT GOTTSCHALK
Commissioner of Patents